(12) United States Patent
Sakhnini et al.

(10) Patent No.: US 12,446,075 B2
(45) Date of Patent: Oct. 14, 2025

(54) RANDOM ACCESS RADIO NETWORK TEMPORARY IDENTIFIER FOR HIGHER SUBCARRIER SPACING

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/957,099

(22) Filed: Sep. 30, 2022

(65) Prior Publication Data

US 2023/0108411 A1    Apr. 6, 2023

Related U.S. Application Data

(60) Provisional application No. 63/251,540, filed on Oct. 1, 2021, provisional application No. 63/251,535, filed on Oct. 1, 2021.

(51) Int. Cl.
*H04W 74/08* (2024.01)
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ................................................ H04W 74/0833
See application file for complete search history.

(56) References Cited

U.S. PATENT DOCUMENTS

2022/0167427 A1* 5/2022 Ko ........................ H04L 5/0053
2022/0225416 A1* 7/2022 He .................... H04W 72/0446
(Continued)

OTHER PUBLICATIONS

Ericsson: "Initial Access Aspects", R1-2107050, 3GPP TSG-RAN WG1 Meeting #106-e, 3GPP, Mobile Competence Centre, 650, Route Deslucioles, F-06921 Sophia-Antipolis Cedex, France, vol. RAN WG1, No. e-Meeting, Aug. 16, 2021-Aug. 27, 2021, Aug. 6, 2021, 27 Pages, XP052038183, Section 3.2 PRACH Configuration, Section 3.3 RA-RNTI", Section 3.4 Gaps between Consecutive RACH Occasions", Section Conclusion, Observations 11 and 12.
(Continued)

*Primary Examiner* — Derrick V Rose
(74) *Attorney, Agent, or Firm* — Patterson + Sheridan, L.L.P.

(57) ABSTRACT

Certain aspects of the present disclosure provide techniques for wireless communication by a user equipment, comprising transmitting, to a network entity, a physical random access channel (PRACH) preamble in a random access channel (RACH) occasion (RO) within a RACH slot, generating a random access radio network temporary identifier (RA-RNTI) based, at least in part, on the RO in which the PRACH was transmitted and whether a configured number of ROs exceeds the RO capacity of one or more configured RACH slots defined within a reference slot, and using the RA-RNTI to process a random access response (RAR) message transmitted from the network entity in response to the PRACH preamble.

22 Claims, 18 Drawing Sheets

(56) References Cited

U.S. PATENT DOCUMENTS

2022/0279590 A1\* 9/2022 Lee .................. H04L 27/26134
2024/0188144 A1\* 6/2024 Liu .................. H04L 27/26025

OTHER PUBLICATIONS

International Search Report and Written Opinion—PCT/US2022/077446—ISA/EPO—Jan. 17, 2023.

Sharp: "Initial Access Aspects", R1-2107789, 3GPP TSG RAN WG1#106-e, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 16 Pages, XP052038667, Section "3.2. RACH Occasion Resources", Section "3.3. RA-RNTI Calculation", Section "4 Conclusion" and Proposals 1-8.

Vivo: "Discussions on Initial Access Aspects for NR Operation from 52.6GHz to 71GHz", R1-2106579, 3GPP TSG RAN WG1 #106-e, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 17 Pages, XP052037885, Section "3.2 RO Configuration", Section "3.3 RA-RNTI calculation", Section "4 Conclusion".

\* cited by examiner

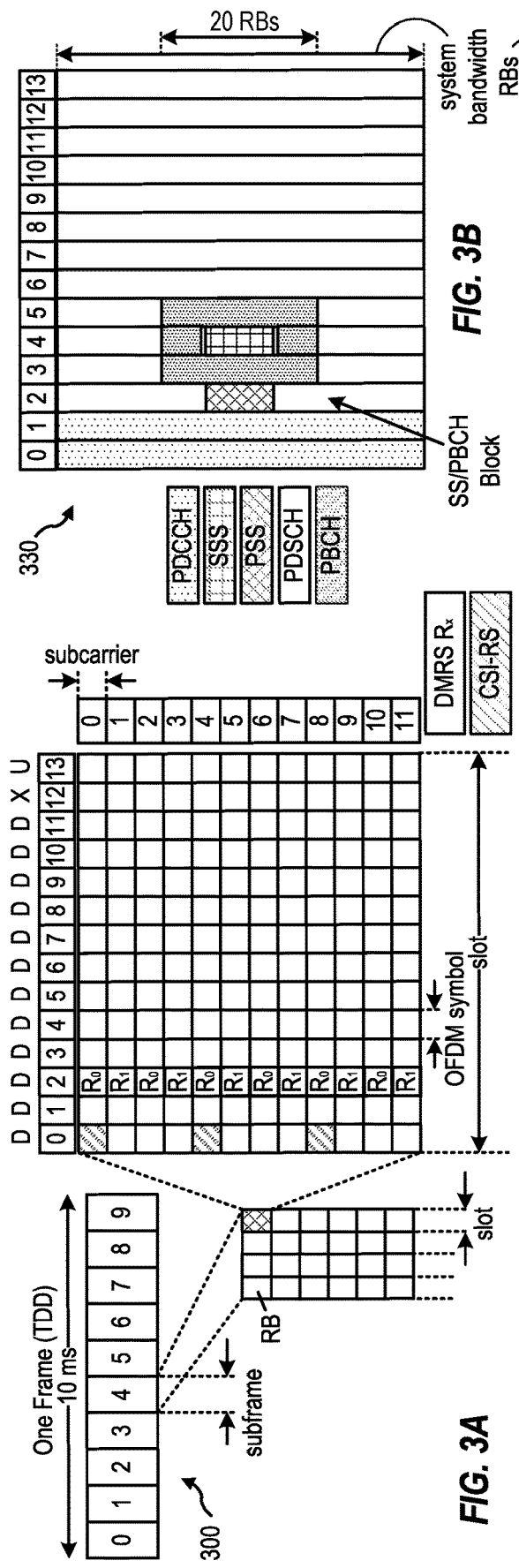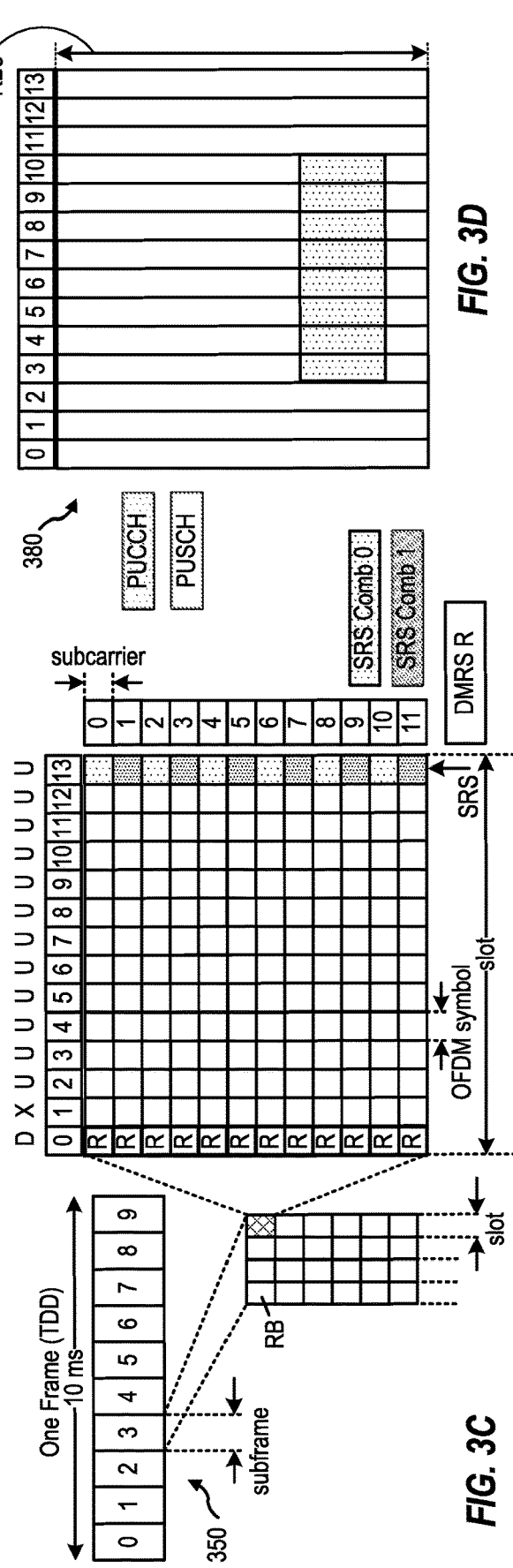

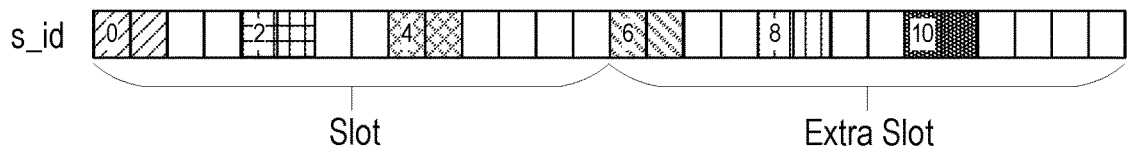
FIG. 10A
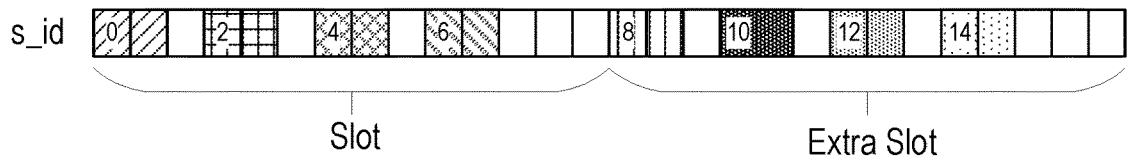
FIG. 10B
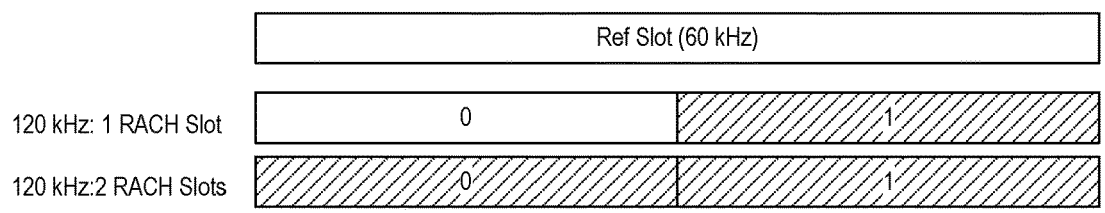
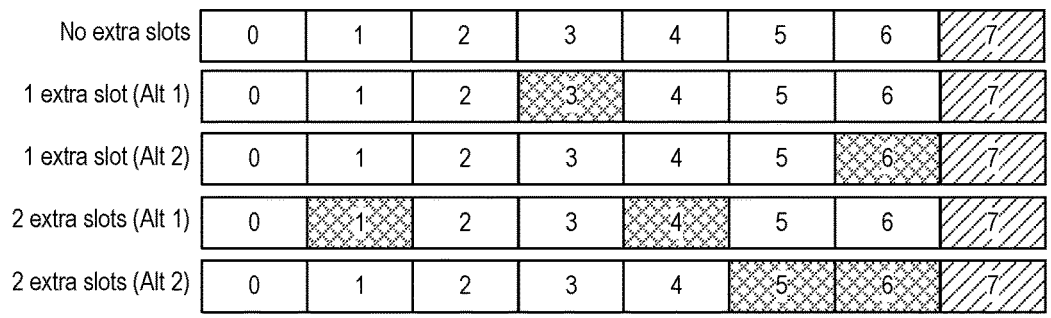
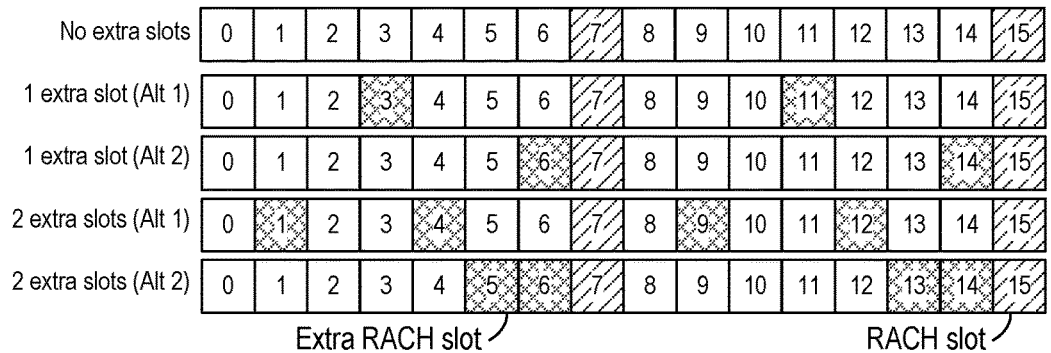
FIG. 10C

1100

A METHOD FOR WIRELESS COMMUNICATION FOR A USER EQUIPMENT

↓ 1110

TRANSMIT, TO A NETWORK ENTITY, A PHYSICAL RANDOM ACCESS CHANNEL (PRACH) PREAMBLE IN A RANDOM ACCESS CHANNEL (RACH) OCCASION (RO) WITHIN A RACH SLOT

↓ 1120

GENERATE A RANDOM ACCESS RADIO NETWORK TEMPORARY IDENTIFIER (RA-RNTI) BASED, AT LEAST IN PART, ON THE RO IN WHICH THE PRACH WAS TRANSMITTED AND WHETHER A CONFIGURED NUMBER OF ROS EXCEEDS THE RO CAPACITY OF ONE OR MORE CONFIGURED RACH SLOTS DEFINED WITHIN A REFERENCE SLOT

↓ 1130

USE THE RA-RNTI TO PROCESS A RANDOM ACCESS RESPONSE (RAR) MESSAGE TRANSMITTED FROM THE NETWORK ENTITY IN RESPONSE TO THE PRACH PREAMBLE

```
┌─────────────────────────────────────────┐
│ A METHOD FOR WIRELESS COMMUNICATION BY A USER │
│        EQUIPMENT (UE), COMPRISING        │
└─────────────────────────────────────────┘
                    ↓
                                              ┌─ 1310
┌─────────────────────────────────────────────────────┐
│ RECEIVE A RANDOM ACCESS CHANNEL (RACH) CONFIGURATION│
│ CONFIGURING THE UE WITH A NUMBER OF RACH OCCASIONS (ROS) │
└─────────────────────────────────────────────────────┘
                    ↓
                                              ┌─ 1320
┌─────────────────────────────────────────────────────┐
│ IDENTIFY, WHEN THE CONFIGURED NUMBER OF ROS EXCEEDS THE │
│ RO CAPACITY OF ONE OR MORE CONFIGURED RACH SLOTS DEFINED │
│ WITHIN A REFERENCE SLOT, ONE OR MORE ADDITIONAL RACH SLOTS │
│              WITHIN THE REFERENCE SLOT              │
└─────────────────────────────────────────────────────┘
                    ↓
                                              ┌─ 1330
┌─────────────────────────────────────────────────────┐
│ TRANSMIT A PHYSICAL RACH (PRACH) PREAMBLE IN AN RO IN ONE OF │
│   THE CONFIGURED RACH SLOTS OR THE ADDITIONAL RACH SLOTS    │
└─────────────────────────────────────────────────────┘
```

```
A METHOD FOR WIRELESS COMMUNICATION BY A
NETWORK ENTITY, COMPRISING
```

↓ 1410

TRANSMIT, TO A USER EQUIPMENT (UE), A RANDOM ACCESS CHANNEL (RACH) CONFIGURATION CONFIGURING THE UE WITH A NUMBER OF RACH OCCASIONS (ROS)

↓ 1420

IDENTIFY, WHEN THE CONFIGURED NUMBER OF ROS EXCEEDS THE RO CAPACITY OF ONE OR MORE CONFIGURED RACH SLOTS DEFINED WITHIN A REFERENCE SLOT, ONE OR MORE ADDITIONAL RACH SLOTS WITHIN THE REFERENCE SLOT

↓ 1430

MONITOR ROS IN THE CONFIGURED RACH SLOTS AND THE ADDITIONAL RACH SLOTS FOR A PHYSICAL RACH (PRACH) PREAMBLE FROM THE UE

*FIG. 14*

RANDOM ACCESS RADIO NETWORK TEMPORARY IDENTIFIER FOR HIGHER SUBCARRIER SPACING

CROSS-REFERENCE TO RELATED APPLICATIONS

This application claims benefit of and priority to U.S. Patent Application Nos. 63/251,535, filed Oct. 1, 2021, and 63/251,540, filed Oct. 1, 2021, which are assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for generating random access (RA) radio network temporary identifiers (RA-RNTIs) for higher frequency sub-carrier spacing (SCS).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), comprising transmitting, to a network entity, a physical random access channel (PRACH) preamble in a random access channel (RACH) occasion (RO) within a RACH slot, generating a random access radio network temporary identifier (RA-RNTI) based, at least in part, on the RO in which the PRACH was transmitted and whether a configured number of ROs exceeds the RO capacity of one or more configured RACH slots defined within a reference slot, and using the RA-RNTI to process a random access response (RAR) message transmitted from the network entity in response to the PRACH preamble.

One aspect provides a method for wireless communication by a network entity, comprising receiving, from a UE, a PRACH preamble in a RO within a RACH slot, generating an RA-RNTI based, at least in part, on the RO in which the PRACH was transmitted and a number of RACH slots in a frame, and using the RA-RNTI to process a RAR message transmitted from the network entity to the UE in response to the PRACH preamble.

One aspect provides a method for wireless communication by a user equipment (UE), comprising receiving a random access channel (RACH) configuration configuring the UE with a number or RACH occasions (ROs), identifying, when the configured number of ROs exceeds the RO capacity of one or more configured RACH slots defined within a reference slot, one or more additional RACH slots within the reference slot, and transmitting a physical RACH (PRACH) preamble in an RO in one of the configured RACH slots or the additional RACH slots.

One aspect provides a method for wireless communication by a network entity, comprising transmitting, to a UE, a RACH configuration configuring the UE with a number of ROs, identifying, when the configured number of ROs exceeds the RO capacity of one or more configured RACH slots defined within a reference slot, one or more additional RACH slots within the reference slot, and monitoring ROs in the configured RACH slots and the additional RACH slots for a physical RACH (PRACH) preamble from the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 3A, FIG. 3B, FIG. 3C, and FIG. 3D depict various example aspects of data structures for a wireless communication network.

FIG. 10A, FIG. 10B, and FIG. 10C illustrate example RO slot extension patterns for different SCSs, in accordance with certain aspects of the present disclosure.

FIG. 11 illustrates example operations for wireless communications by a network entity, in accordance with some aspects of the present disclosure.

FIG. 13 illustrates example operations for wireless communications by a network entity, in accordance with some aspects of the present disclosure.

FIG. 14 illustrates example operations for wireless communications by a user equipment (UE), in accordance with some aspects of the present disclosure.

DETAILED DESCRIPTION

Figure 1:
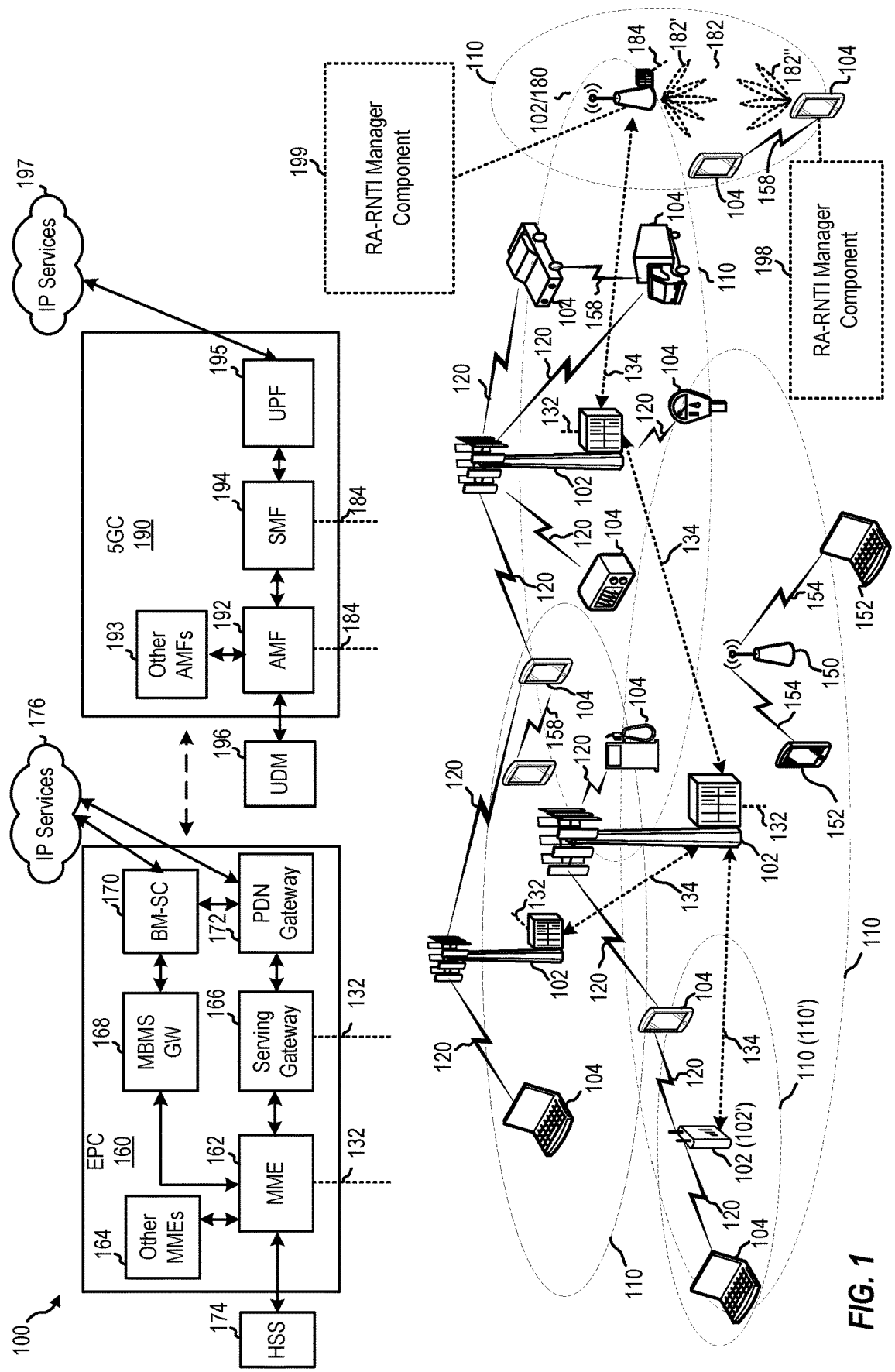
FIG. 1 is a block diagram conceptually illustrating an example wireless communication network.

Aspects of the present disclosure provide apparatuses, methods, processing systems, and computer-readable mediums for generating random access (RA) radio network temporary identifiers (RA-RNTIs) for higher frequency subcarrier spacing (SCS), such as 480 kHz and 960 kHz.

In wireless networks, communications occur using time and frequency resources, generally divided into subcarriers or tones in the frequency domain and symbols in the time domain. Subcarrier spacing is generally equal to the reciprocal of symbol time. Collectively, subcarrier spacing and symbol length are referred to as a numerology.

Downlink and uplink transmissions are organized into frames (e.g., with 10 ms duration, each consisting of a set of subframes (e.g., 10×1 ms subframes). Each subframe can be further divided into slots. Slots tend to have a same number of symbols. Slot lengths vary depending on the subcarrier spacing such that, generally, slot length gets shorter as subcarrier spacing gets wider (due to shorter symbols).

Reduced slot lengths resulting from wider subcarrier spacing can impact various procedures, such as beam sweeping. Beam sweeping generally refers to transmitting a signal in predefined directions at regular intervals. In an initial access procedure (e.g., when a mobile phone is first turned on), that UE searches for synchronization signal blocks (SSBs) transmitted in different directions (beam swept) in an attempt to synchronize with the network and obtain system information.

Typically, a UE is designed to support a relatively large number of SSB beams (e.g., up to 64). While a larger SCS (hence shorter symbols) can result in reduced beam sweeping time, downlink to uplink DL/UL) switching delays, used to take advantage of uplink segments within an SSB burst, may present a challenge at the UE. Reduced slot durations may also impact random access channel (RACH) procedures, involving physical RACH preamble transmission in RACH occasions (ROs), determined based on SSB detection.

After receiving the RACH preamble sent by the UE, the network sends a random access response (RAR), involving a Random Access RNTI (RA-RNTI). The RA-RNTI is used to scramble a checksum for a physical downlink control channel (PDCCH) that schedules a physical downlink shared channel (PDSCH) that carries the RAR. The RA-RNTI helps the UE identify the RAR corresponds to its RACH preamble transmission. This is because the RA-RNTI is generated using parameters of the RACH preamble in a manner that unambiguously identifies which time-frequency resource was utilized by the UE to transmit the RACH preamble.

A current RA-RNTI equation assumes an index of a first slot of the RACH occasion is less than 80. However, for higher SCSs, this assumption may not hold as the number of RACH slots may be greater than 80.

Aspects of the present disclosure may help address these issues. For example, certain aspects of the present disclosure introduce modifications to the equation for generating an RA-RNTI that may be depending on the actual RO configurations designed to accommodate higher SCS.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes random access (RA) radio network temporary identifier (RA-RNTI) manager component 199, which may be configured to transmit RA-RNTIs for sub-carrier spacing (SCS). Wireless network 100 further includes an RA-RNTI manager component 198, which may be used configured to receive RA-RNTIs for SCS.

Figure 2:
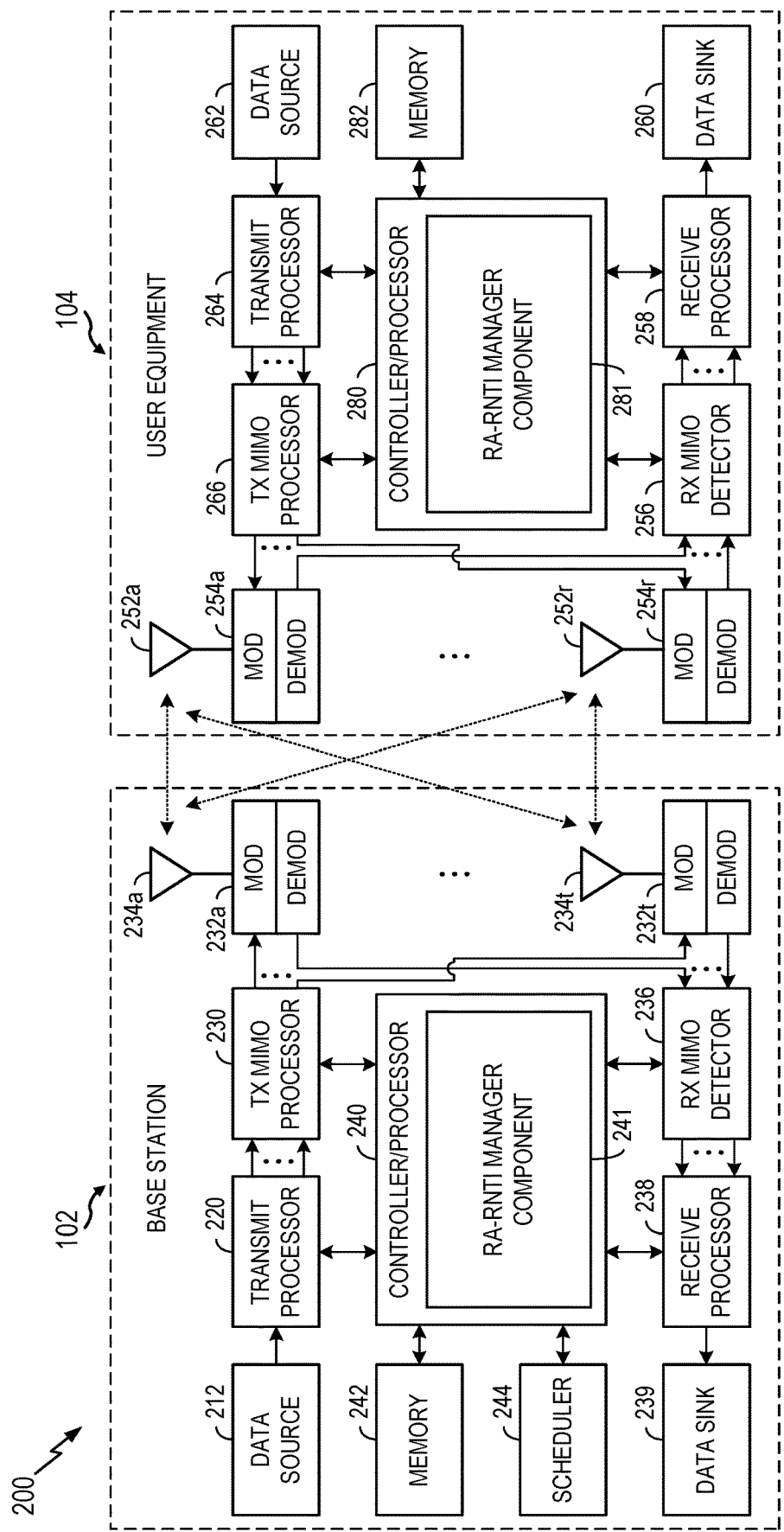
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes an RA-RNTI manager component 241, which may be representative of an RA-RNTI manager component 199 of FIG. 1. Notably, while depicted as an aspect of controller/processor 240, an RA-RNTI manager component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes an RA-RNTI manager component 281, which may be representative of an RA-RNTI manager component 198 of FIG. 1. Notably, while depicted as an aspect of controller/processor 280, an RA-RNTI manager component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Signal Synchronization Block Transmission

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Further system information such as, remaining minimum system information (RMSI), system information blocks (SIBs), other system information (OSI) can be transmitted on a physical downlink shared channel (PDSCH) in certain subframes.

Figure 4:
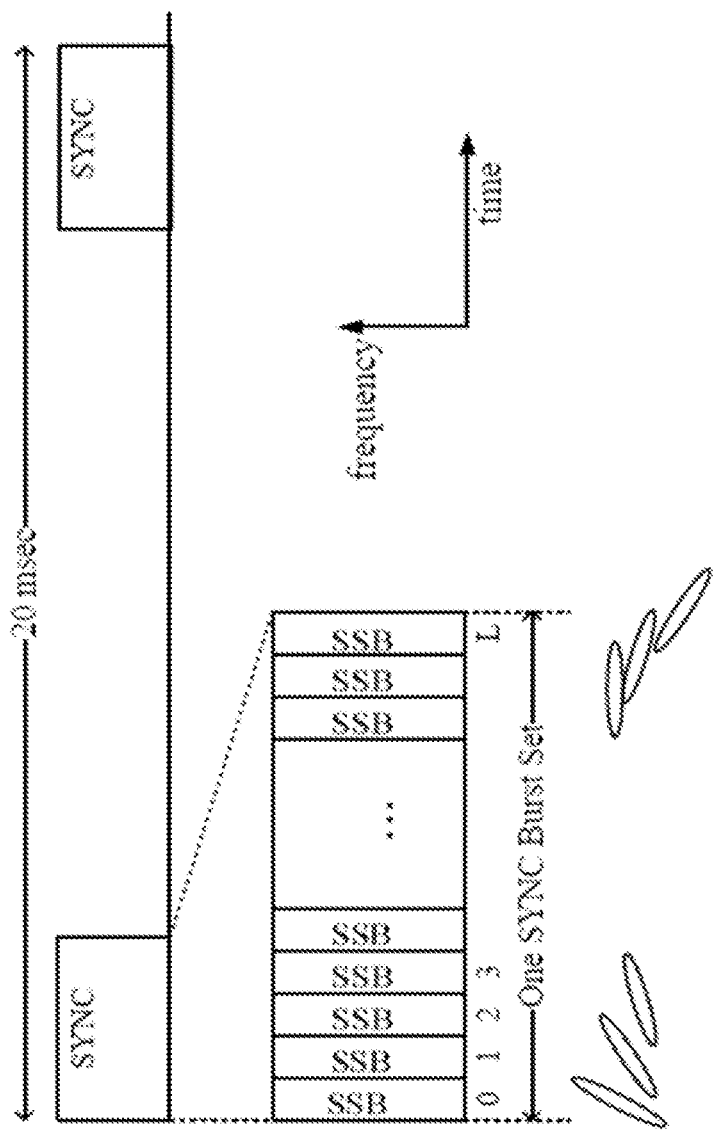
FIG. 4 illustrates how different synchronization signal blocks (SSBs) may be sent using different beams, according to aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (e.g., in certain mmW applications). A physical cell identity (PCI) may still be decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Figure 5:
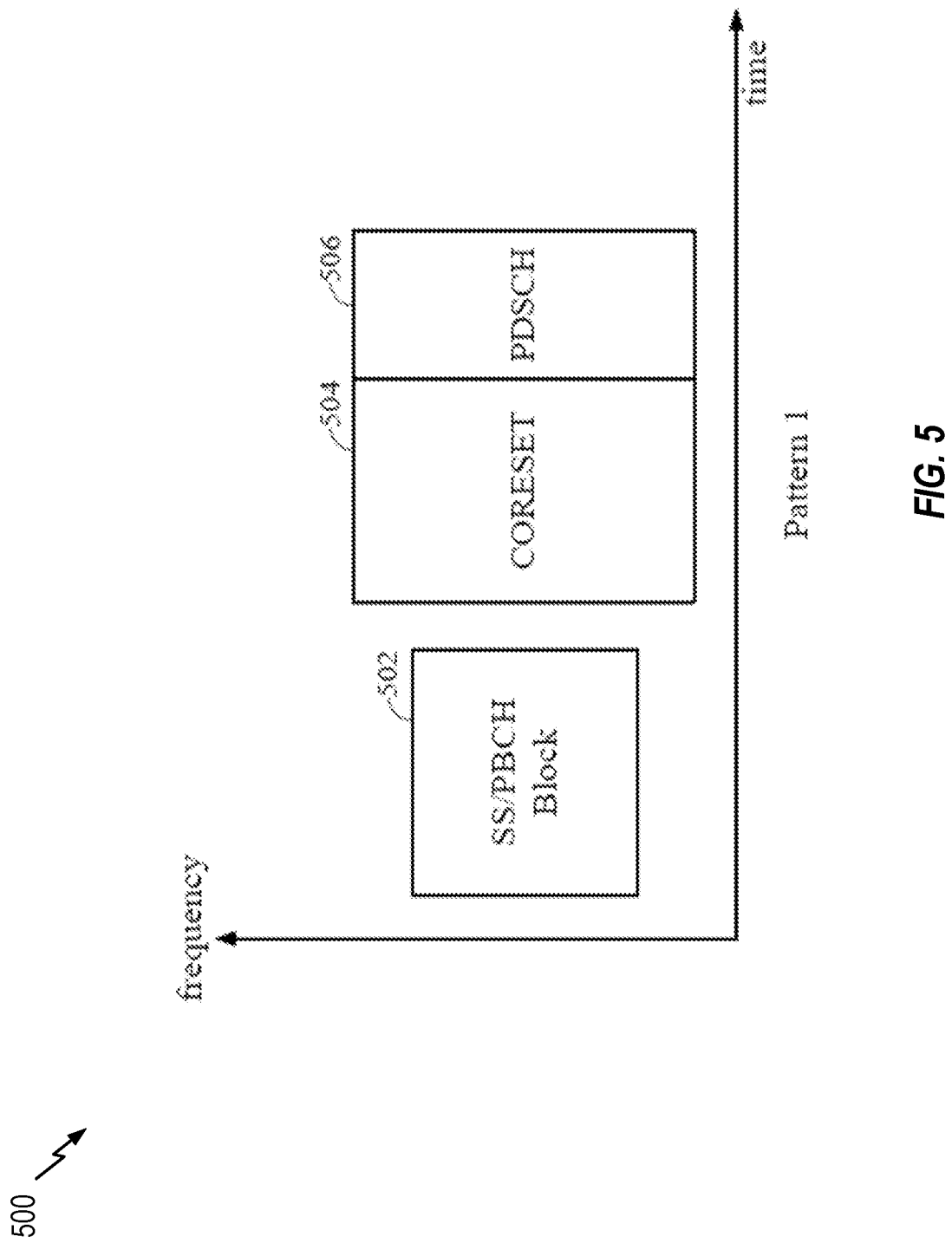
FIG. 5 illustrates an example resource mapping, according to aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a master information block (MIB) conveying an index to a table that relates the time and frequency resources of the CORESET 504 to the time and frequency resources of the SS/PBCH block. The BS may also transmit control signaling. In some scenarios, the BS may also transmit a PDCCH within time/frequency resources of CORESET 504 (e.g., scheduling a PDSCH 506) to a UE.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 6B:
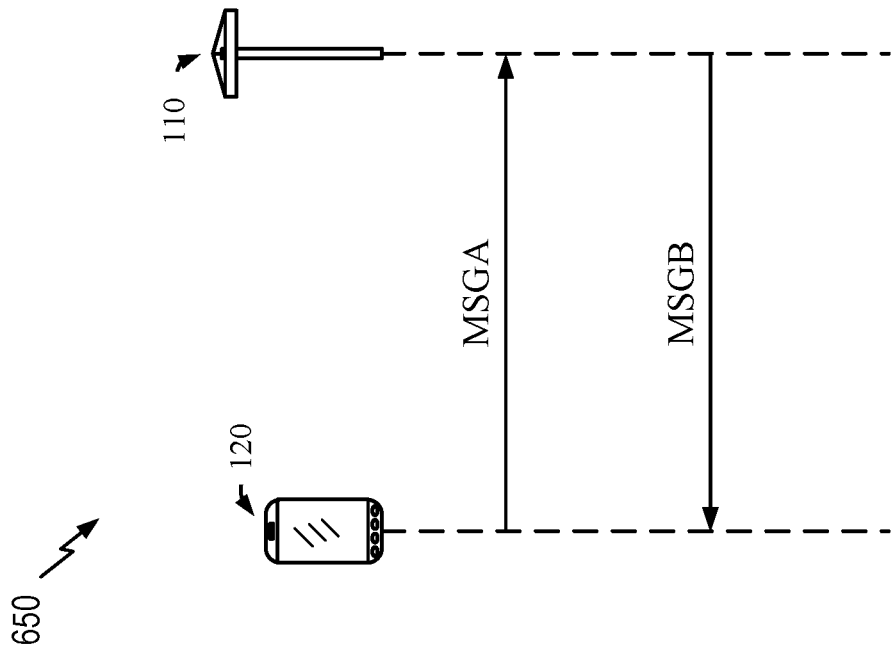
FIG. 6A and FIG. 6B are call-flow diagrams illustrating example four-step and two-step random access channel (RACH) procedures, in accordance with certain aspects of the present disclosure.
Figure 6A:
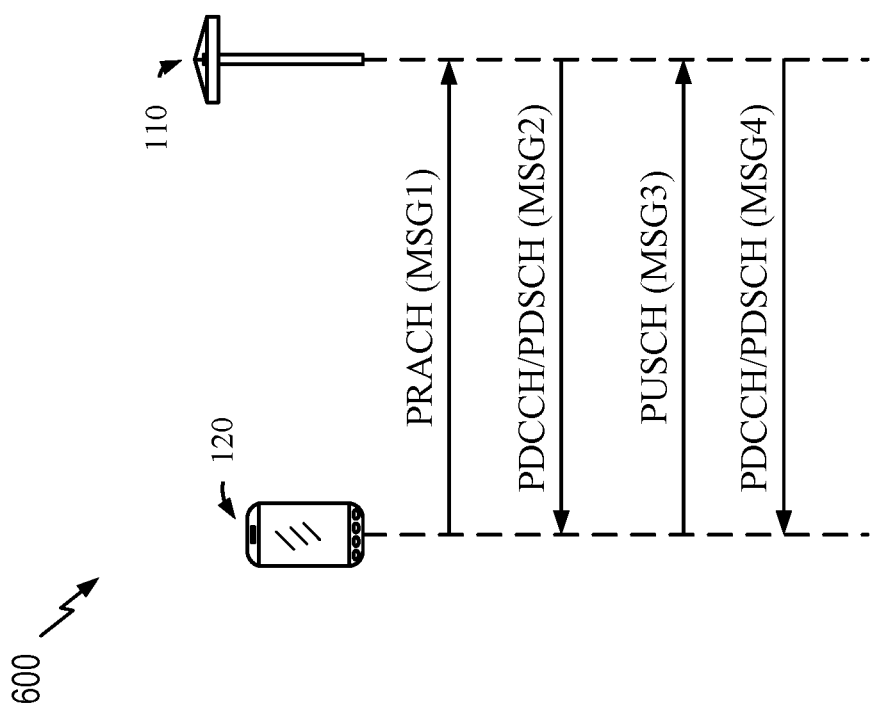

FIG. 6A is a timing (or "call-flow") diagram 600 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG4 which may include a contention resolution message.

In some cases, to speed access, a two-step RACH procedure may be supported. As the name implies, the two-step RACH procedure may effectively "collapse" the four messages of the four-step RACH procedure into two messages.

FIG. 6B is a timing diagram 650 illustrating an example two-step RACH procedure, in accordance with certain aspects of the present disclosure. A first enhanced message (msgA) may be sent from the UE 120 to BS 110. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 110 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:
  (1) selection of a preamble sequence; and
  (2) selection of a preamble occasion in time/frequency domain (for transmitting the selected preamble sequence).

The msgA payload transmission generally involves:
  (1) construction of the random access message payload (DMRS/PUSCH); and
  (2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for a msgA transmission. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Overview of SSB to RACH Occasion Association

Figure 7:
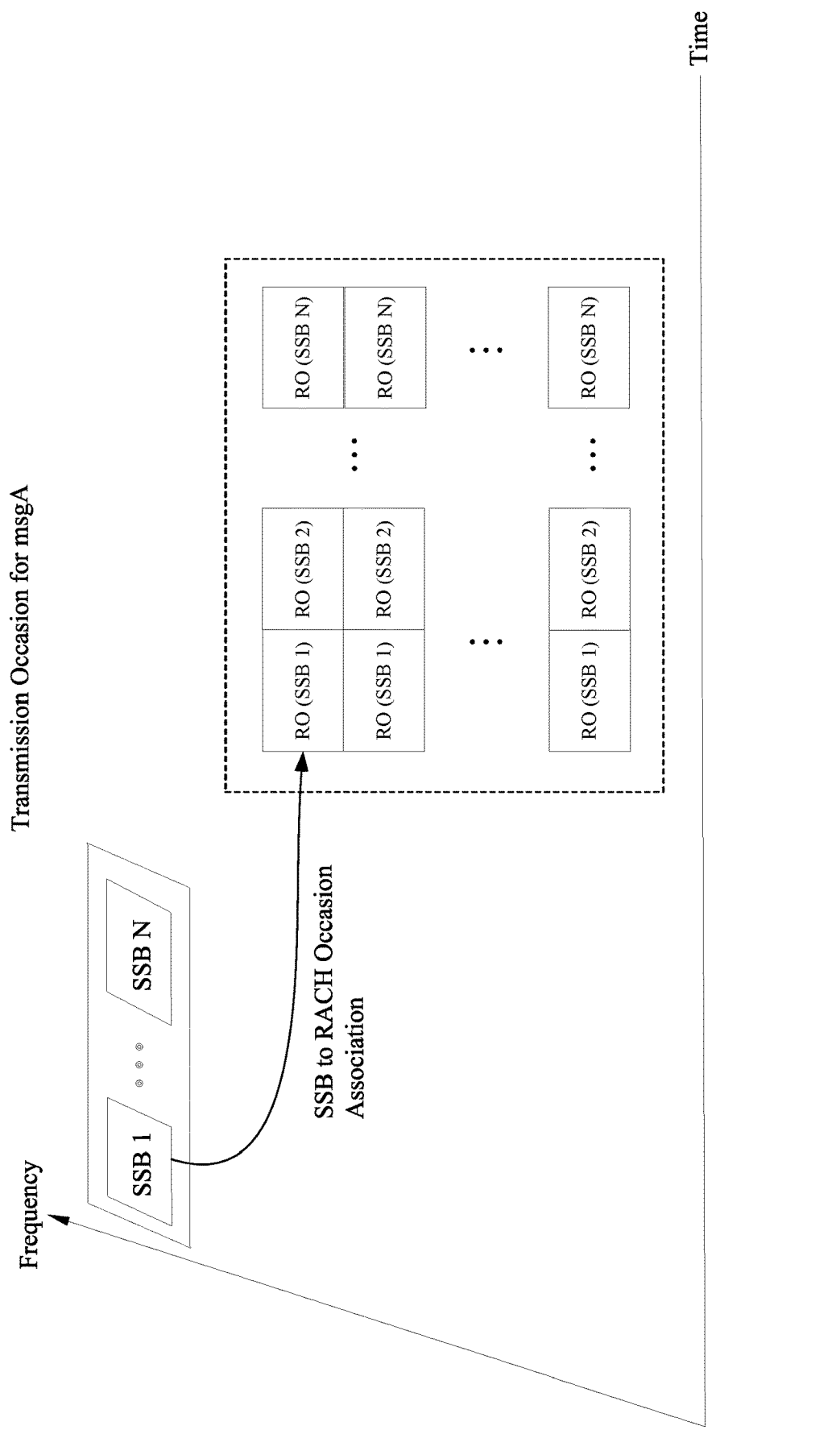
FIG. 7 illustrates an example association of SSBs to RACH occasions (ROs).

After a UE has selected an SSB (beam), for that SS block there is a predefined one or more RACH opportunities (ROs) with certain time and frequency offset and direction (e.g., specific to the selected SSB). FIG. 7 illustrates an example association (mapping) between SSBs and ROs.

This SSB to RO association is used for the gNB to know what beam the UE has acquired/is using (generally referred to as beam establishment). One SSB may be associated with one or more ROs or more than one SSB may be associated with one RO. Association is typically performed in the frequency domain first, then in the time domain within a RACH slot, then in the time domain across RACH slots (e.g., beginning with lower SSB indexes). An association period is typically defined as a minimum number of RACH configuration periods, such that all (configured) SSB beams are mapped into ROs.

Overview of Frequency Ranges

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Aspects Related to RACH Slot Extension Patterns for High Frequency SCS

In some systems (e.g., according to NR), NR operation in a frequency regime between 52.6 GHz and 71 GHz (referred to as "FR2-2") may be deployed. In such systems, new SCSs may be used. For example, in addition to 120 kHz SCS, 480 kHz and 960 kHz SCSs may be used, along with newly defined maximum bandwidth(s), for operation in this frequency range for data and control channels and reference signals.

As noted above, increased SCS may result in various timing related challenges, for example, when supporting up to 64 SSB beams for licensed and unlicensed operation in this frequency range. In some cases, a UE may be expected to support 120 kHz SCS for SSB and 120 kHz SCS for initial access related signals/channels in an initial bandwidth part (BWP) and, perhaps, additional higher SCS (240 kHz, 480 kHz, 960 kHz) for SSB, and additional SCS (480 kHz, 960 kHz) for initial access related signals/channels in an initial BWP. Study and specify, if needed, additional SCS (480 kHz, 960 kHz) for SSB for cases other than initial access.

Various PRACH sequence lengths may be supported (e.g., L=139, L=571 and L=1151) and, in some cases, RO configuration for non-consecutive RACH occasions (RO) in the time domain may be supported for operation in shared spectrum.

In NR Rel-15/16, a PRACH preamble is sent from the UE to the gNB in a RACH Occasion (RO). As described above, with reference to FIG. 7, an RO generally refers to a set of time/frequency resources. A particular RO chosen by a UE to send a RACH preamble is determined by an association with a corresponding SSB (beam) selected by the UE. An RO may carry repeated PRACH preambles, for some PRACH formats (e.g., formats A, B, C).

Figure 8:
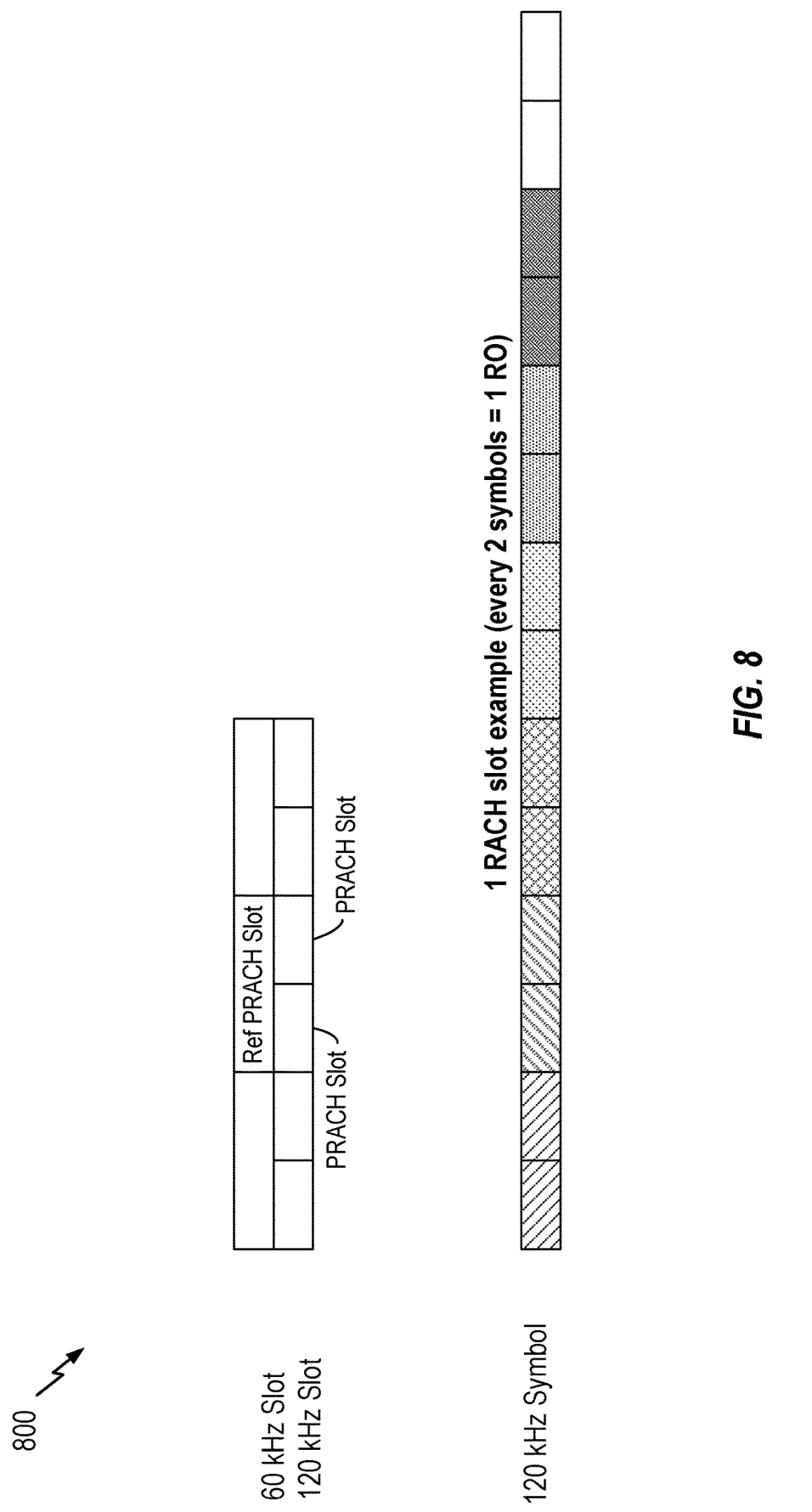
FIG. 8 is an example of ROs within a slot for a given sub-carrier spacing (SCS).

As illustrated in FIG. 8, in some cases, a slot for a first SCS (e.g., a 60 kHz slot) may serve as a reference PRACH slot 800. Due to the lower SCS, multiple PRACH slots of a higher SCS may fit within the reference PRACH slot 800. For example, as shown in FIG. 8, for FR2, two 120 kHz SCS PRACH slots may fit within the 60 kHz reference PRACH slot 800.

As illustrated in FIG. 8, multiple ROs may be configured in a single RACH slot. In the illustrated example, the 120 kHz PRACH slot has 6 ROs, each occupying two symbols. A set of RACH slots may repeat every RACH configuration period.

As noted above, with reference to FIG. 7, SSB to RO association is used for the gNB to know what beam the UE has acquired/is using (beam establishment). One SSB may be associated with one or more ROs or more than one SSB may be associated with one RO. Association is done in the frequency domain, then in time domain within a RACH slot, then in time domain across RACH slots. An association period is defined as the minimum number of RACH configuration periods such that all SSB beams are mapped into ROs.

In some cases, for 480 and 960 kHz PRACH, at least the same RO density in the time domain (e.g., the number of specified RO per reference slot according the PRACH configuration index) may be supported as for 120 kHz PRACH in FR2. In some cases, gaps between consecutive ROs in the time domain may also be supported.

For 480 and 960 kHz PRACH, when a PRACH slot is able to contain all time domain PRACH occasions corresponding to a PRACH configuration index (including gap(s) between consecutive PRACH occasions, if supported) the PRACH slot index may be determined to account for LBT and/or beam switching when number of PRACH slots in a reference slot is 1, as follows:

$n_{slot}^{RA}$=[7] for 480 kHz and $n_{slot}^{RA}$=[15] for 960 kHz PRACH;

and when the number of PRACH slots in a reference slot is 2, $n_{slot}^{RA}$=[3,7] for 480 kHz and $n_{slot}^{RA}$=[7,15] for 960 kHz PRACH.

Mechanisms may be provided for determining $n_{slot}^{RA}$ values, when a PRACH slot cannot contain all time domain PRACH occasions, corresponding to a PRACH configuration including gap(s) between consecutive PRACH occasions (if supported) to account for LBT and/or beam switching. In some cases, additional $n_{slot}^{RA}$ values may be allowed, for example, if the maximum that can be configured for the number of FD RO's is less than 8 (e.g., due to a bandwidth limitation).

In some cases, for 480 and 960 kHz PRACH, a reference slot duration may correspond to a 60 kHz SCS. A PRACH slot index, $n_{slot}^{RA}$, may correspond to one of the starting 480/960 kHz PRACH slots within the reference slot.

NR Rel-16 allows multiplexing of ROs back-to-back because the gNB beam switching delay can be absorbed by the CP (i.e., the CP may be long enough to absorb the beam switching delays). However, in higher bands and SCS (e.g., SCS=480 and 960 kHz), the CP length may not be long enough to absorb this beam switching delay requirement. In addition, listen before talk (LBT) gaps may be needed which can be as long as one or more ROs.

To mitigate this issue, gaps between ROs (of different beams) may be included to accommodate beam switching. Without including explicit gaps, some PRACH symbol repetitions may be lost and it may be left to gNB implementation to determine how to handle any repetition preamble losses. Therefore, in some cases, at least a PRACH symbol level gap may be included between ROs. In other cases, a longer gap (e.g., an RO-level gap) may be included between ROs.

Figure 9:
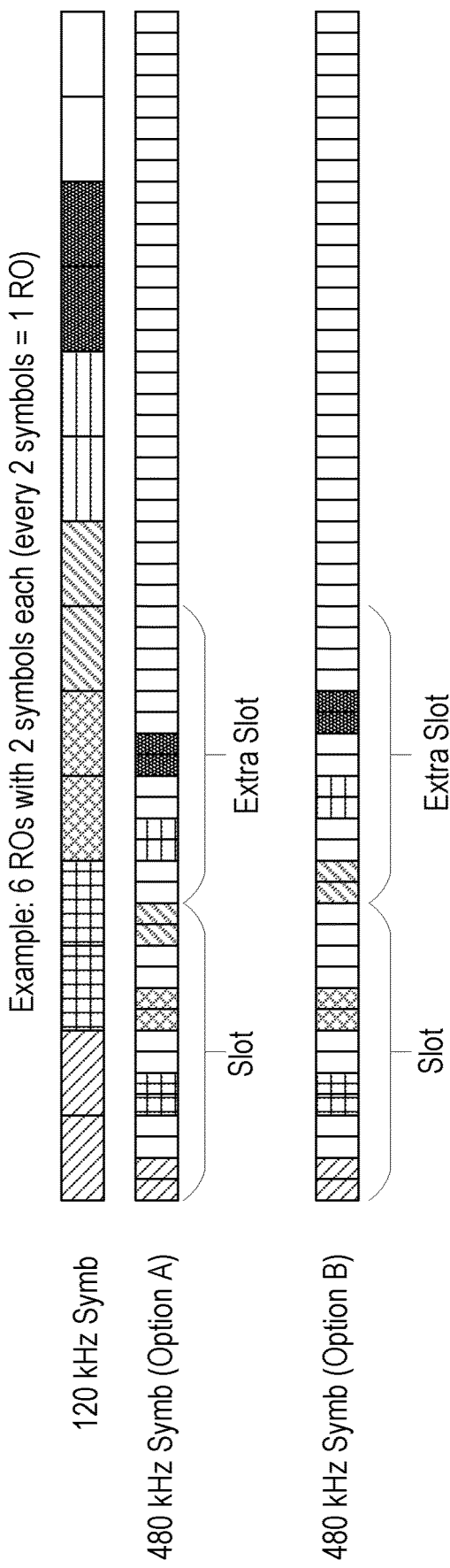
FIG. 9 illustrates example RO patterns for different SCSs, in accordance with certain aspects of the present disclosure.

FIG. 9 shows examples of various options for introducing gaps between ROs of different beams. As shown, four 480 kHz slots may fit in a 120 kHz slot and each RO spans two symbols.

According to a first option, referred to (and labeled in FIG. 9) as Option A, ROs and gaps are time-division multiplexed (TDM'd) until all required number of ROs are satisfied (e.g., based on an association with a corresponding set of SSBs), even if the ROs extend to an extra slot. For example, a two-symbol length gap placed between each RO in the 480 kHz RACH slot, as illustrated, causes the ROs to extend to an extra slot. For Option A, four slots are located in the RACH slot, while the remaining two extend into the extra slot.

According to a second option, referred to (and labeled in FIG. 9) as Option B, the total number of ROs may be split evenly among multiple slots such that the resulting gap pattern is the same for all slots. For example, in the illustrated example with six ROs, three ROs occupy the first slot, and the remaining three ROs can occupy the extra slot.

Because the ROs may spill into extra slots, for higher RACH SCS (480 and 960 kHz), more than 2 RACH slots (extra slots) per RACH reference slots may be needed due to gaps and/or coverage enhancement needs.

Aspects Related to RA-RNTI Generation for High Frequency SCS

As noted above, after receiving the RACH preamble sent by the UE in an RO, the network sends a random access response (RAR). The RAR is conveyed in a PDSCH that is scheduled by a PDCCH with a checksum that is scrambled by an RA-RNTI. The RA-RNTI is intended to unambiguously identify which time-frequency resource was utilized by the UE to transmit the RACH preamble and, in so doing, to help the UE identify the RAR corresponds to its RACH preamble transmission.

However, a current equation used to generate the RA-RNTI is based on assumptions that may not hold true for higher SCSs. The current equation used to compute the RA-RNTI associated with the PRACH occasion in which the preamble is transmitted is:

$$RA\text{-}RNTI = 1 + s\_id + 14 \times t\_id + 14 \times 80 \times f\_id + 14 \times 80 \times 8 \times ul\_carrier\_id;$$

where:
s_id is the index of the first OFDM symbol of the PRACH occasion (0≤s_id<14);

t_id is the index of the first slot of the PRACH occasion in a system frame (0≤t_id<80);

f_id is the index of the PRACH occasion in the frequency domain (0≤f_id<8); and ul_carrier_id is the UL carrier used for preamble transmission (0 for NUL carrier, and 1 for SUL carrier).

As shown, the calculation uses t_id<80, which assumes a 10 ms RAR window (the window in which the UE monitors for an RAR after sending the RACH preamble) and a maximum SCS of 120 kHz (80 slots in a frame). As explained above, however, for higher bands and higher SCSs (480 and 960 kHz) extra RACH slots may be used in certain cases.

In case no extra slots are needed, the number of RACH slots in a frame may be limited (e.g., =80) and there may be no issue calculating RA-RNTI according to the equation above. However, the number of RACH slots in a frame can exceed the assumed (e.g., greater than 80) for the various cases described above. Hence, keeping the equation unchanged in this case (with the assumption that t_id<80 slots) mean the maximum RAR window would be less than 10 ms. This reduced maximum RAR window may be restrictive (e.g., if 2 extra slots are used, we have 160 RACH slots in a frame and the maximum RAR window would be halved to 5 ms).

In addition, in NR Rel-16, RAR window (or MSGB window for a 2-step RACH) and NR unlicensed (NR-U) RAR window are extended to 40 ms, by including the 2-bit LSB of the system frame number (SFN) corresponding to the PRACH occasion used to transmit the preamble of MSGA in RAR PDCCH.

Aspects of the present disclosure introduce modifications to the equation for generating an RA-RNTI that may be dependent on the actual RO design. The mechanisms presented herein address various cases, for example, (Case 1) when no extra RACH slots are used (needed/configured), (Case 2) when extra RACH slots are used but with the same number of ROs per reference slot, and (Case 3) when extra RACH slots are used with more ROs per reference slot.

For the first case, when no extra RACH slots are needed or configured, the number of 480/960 kHz RACH slots per frame may be the same as that for 120 kHz (e.g., 1 or 2 slots per reference slot). Hence, the equation above may be re-used by redefining the t_id parameter as:

t_id is the index of the first slot (based on 120 kHz numerology) of the PRACH occasion in a system frame (0≤t_id<80).

The second case addressed is when extra RACH slots are needed or configured (but with the same number of ROs per reference slot). For example, this case is illustrated in FIG. 9 and can be due to gaps needed and ROs spilling into more slots than configured. In this case, modifications may be considered to the s_id term of the RA-RNTI equation, since the ROs will now span more than one slot (i.e., more than the 14 symbols of one slot). However, if the number ROs is the same, the total number of actual symbols used by all the ROs (albeit across more than one slot) may still be within 14 (by not counting the symbols of the gaps in between). Hence, the s_id parameter may be redefined as:

s_id is the index of the first OFDM symbol of the PRACH occasion within the one or more slots spanned by the ROs excluding any gaps (0≤s_id<14).

The impact of this redefinition may be seen with reference to FIG. 10A. In this example, the (6) ROs extend into an extra slot. Without this redefinition, the ROs starting at the same symbol in each slot would result in the same s_id. However, by excluding gaps when determining s_id, the s_id for the second RO that occurs in symbol 4 of the configured slot has a value of 2 rather than a value of 4. Similarly, the s_id for the third RO that occurs in symbol 4 of the configured slot has a value of 4 rather than a value of 8. In the extra slot, ambiguity is removed because the s_id for the fourth RO that occurs in symbol 0 of the extra slot has a value of 6 rather than a value of 0. Similarly, the s_id for the fifth RO that occurs in symbol 4 of the extra slot has a value of 8 rather than a value of 4, while the s_id for the sixth RO that occurs in symbol 8 of the extra slot has a value of 10 rather than a value of 8. A similar approach may hold for t_id as for the previous case (Case 1):

t_id is the index of the first slot (based on 120 kHz numerology) of the PRACH occasion in a system frame (0≤t_id<80).

The third case is when extra RACH slots are needed or configured with more ROs than in a reference slot. This case may be configured, for example, to achieve extra capacity to enhance coverage (e.g., with longer ROs). In this case, the s_id term of the equation may again be reconsidered, since the ROs will again span more than one slot (i.e., >14 symbols). Thus, aspects of the present disclosure provide various options for using extending the range for s_id.

According to a first option (Option A), the s_id may be extended to more than 14 by introducing a new parameter S and the equation may be modified as follows:

$$\text{RA-RNTI} = (1 + s\_id + S \times t\_id + S \times 80 \times f\_id + S \times 80 \times 8 \times ul\_carrier\_id) \bmod 2^{16};$$

where:
s_id is the index of the first OFDM symbol of the PRACH occasion within the one or more slots spanned by the ROs excluding any gaps (0≤s_id<S);
S can take a value greater than 14 (S>14); and
t_id is the index of the first slot (based on 120 kHz numerology) of the PRACH occasion in a system frame (0≤t_id<80).

FIG. 10B illustrates an example where S has a value of 16 for a case of 8 ROs, including 4 that extend into an extra slot. Expanding the range of s_id based on S=16 and by excluding gaps when determining s_id, the s_id for the second RO that occurs in symbol 3 of the configured slot has a value of 2 rather than a value of 3. Similarly, the s_id for the third RO that occurs in symbol 6 of the configured slot has a value of 4 rather than a value of 6, while the fourth RO that occurs in symbol 9 of the configured slot has a value of 6 rather than a value of 9. In the extra slot, ambiguity is removed because the s_id for the fifth RO that occurs in symbol 0 of the extra slot has a value of 8 rather than a value of 0, the sixth RO that occurs in symbol 3 of the extra slot has a value of 10 rather than a value of 3, the s_id for the seventh RO that occurs in symbol 9 of the extra slot has a value of 12 rather than a value of 9, and the s_id for the eighth RO that occurs in symbol 12 of the extra slot has a value of 14 rather than a value of 9.

With this option, the RA-RNTI can be more than FFFF and, thus, a modulus operation may be applied. Due to the modulus operation, there is the possibility that some ROs will have the same RA-RNTI and may collide with certain reserved or pre-allocated values (e.g., FFF0-FFFD) or values reserved for paging RNTI (P-RNTI, FFFE) or system information RNTI (SI-RNTI, FFFF). In this case, the ROs with RA-RNTI conflicting with the pre-allocated RNTIs should not be used. When multiple ROs have the same RA-RNTI but are not conflicting with the pre-allocated RNTIs, only one of the ROs can be used (e.g., the first RO among those ROs with the same RA-RNTI) or an existing contention resolution mechanisms may be applied.

According to a second option (Option B), when extra RACH slots are needed or configured with more ROs than in a reference slot, the existing NR RA-RNTI equation may be reused, while conveying additional system timing information. The additional system timing information may be conveyed, for example, in the DL DCI that schedules the MSG2/MSGB. This can be done by using the same Rel-15/16 equation but with the equation is based on the following:

t_id is the index of the first slot (based on 120 kHz numerology) of the PRACH occasion in a system frame (0≤t_id<80); and
signaling in the DL DCI that schedules the MSG2/MSGB the 480/960 kHz slot index within the 120 kHz slot.

As described herein, aspects of the present disclosure provide various mechanism for generating an RA-RNTI that may depend on the actual RO configurations designed to accommodate higher SCS.

Because the ROs may spill into extra slots, for higher RACH SCS (480 and 960 kHz), more than 2 RACH slots (extra slots) per RACH reference slots may be needed due to gaps and/or coverage enhancement needs.

Aspects of the present disclosure provide mechanisms that may help determine where these extra slots should be placed within a reference slot.

FIG. 10C depicts example RO slot extension patterns for different SCSs, in accordance with certain aspects of the present disclosure. If extra slots are needed (e.g., due to ROs needing more RACH slots in a reference slot because of gaps and/or coverage enhancement needs or any other need), the one or more extra slot can be added in specified regions within the RACH reference slot.

According to a first option, referred to (and labeled in FIG. 10C) as Alt 1, extra slots are added such that the slots are distributed within the RACH reference slot according to a predefined pattern. For example, as illustrated, slots may be distributed evenly within the RACH reference slot.

As illustrated, for the case of 480 kHz SCS, with one configured RACH slot at slot 7, when one extra slot is used, the extra slot may be located at slot 3. When two extra slots are needed, the extra slots may be located at slots 1 and 4.

For the case of 960 kHz SCS, with two configured RACH slots at slots 7 and 15, when one extra slot is used (per configured RACH slot), one extra slot may be located at slot 11 and another at slot 3. When two extra slots are used (per configured RACH slot), the extra slots may be located at slots 9, 12, 4, and 1.

This first option may have the advantage of distributing the RACH detection load on the gNB. This may be important, for example, in scenarios where a high number of UEs are present.

According to a second option, referred to (and labeled in FIG. 10C) as Alt 2, the extra slots may be added in slots immediately adjacent to the original (configured) RACH slots. A potential advantage to this second option is that it may result in less UL fragmentation, which could allow for more flexible uplink scheduling.

As illustrated, for the case of 480 kHz SCS, with one configured RACH slot at slot 7, when one extra slot is used, the extra slot may be located at adjacent slot 6. When two extra slots are needed, the extra slots may be located at adjacent slots 5 and 6.

For the case of 960 kHz SCS, with two configured RACH slots at slots 7 and 15, when one extra slot is used (per configured RACH slot), one extra slot may be located at adjacent slot 14 and another at slot 6. When two extra slots are used (per configured RACH slot), the extra slots may be located at adjacent slots 14, 13, 6, and 5.

In some cases, the gNB may configure the UE with the slot extension pattern (e.g., Alt 1 or Alt 2) to be used.

The extra slots may be used in different manners. For example, the extra slots could be used for new or additional ROs or beams to maintain or increase the RACH capacity. In some cases, the extra slots could be used for repetitions of existing ROs or beams for coverage enhancement. In some cases, a combination of these options may be used. For example, in such cases, some extra slots could be used for new or additional ROs or beams, while other extra slots are used for repetitions.

Example Methods

FIG. 11 illustrates example operations 1100 for wireless communications by a user equipment (UE), in accordance with some aspects of the present disclosure. For example, a UE 104 of FIG. 1 may perform the example operations 1100.

At 1110, the UE transmits, to a network entity, a physical random access channel (PRACH) preamble in a random access channel (RACH) occasion (RO) within a RACH slot.

At 1120, the UE generates a random access radio network temporary identifier (RA-RNTI) based, at least in part, on the RO in which the PRACH was transmitted and whether a configured number of ROs exceeds the RO capacity of one or more configured RACH slots defined within a reference slot.

At 1130, the UE use the RA-RNTI to process a random access response (RAR) message transmitted from the network entity in response to the PRACH preamble.

Figure 12:
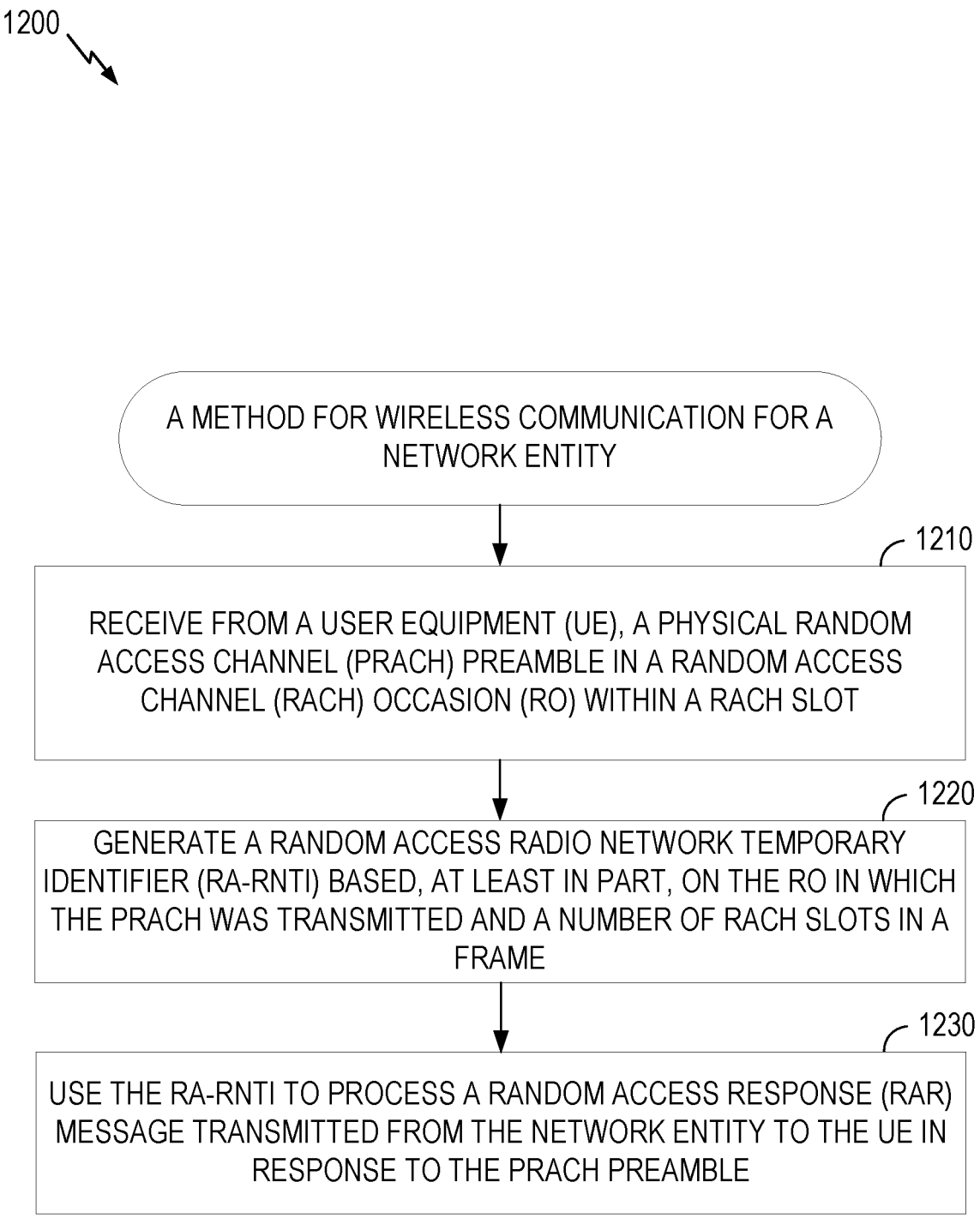
FIG. 12 illustrates example operations for wireless communications by a user equipment (UE), in accordance with some aspects of the present disclosure.

FIG. 12 illustrates example operations 1200 for wireless communications by a network entity in accordance with some aspects of the present disclosure. For example, a base station 102 (e.g., a gNB) may perform the example operations 1200.

At 1210, the network entity receives, from a UE, a PRACH preamble in a RO within a RACH slot.

At 1220, the network entity generates an RA-RNTI based, at least in part, on the RO in which the PRACH was transmitted and a number of RACH slots in a frame.

At 1230, the network entity uses the RA-RNTI to process a RAR message transmitted from the network entity to the UE in response to the PRACH preamble.

FIG. 13 illustrates example operations 1300 for wireless communications by a user equipment (UE), in accordance with some aspects of the present disclosure. For example, a UE 104 of FIG. 1 may perform the example operations 1300.

At 1310, the UE receives a random access channel (RACH) configuration configuring the UE with a number of RACH occasions (ROs). For example, UE 104 may receive a RACH configuration configuring UE 104 with a number of ROs.

At 1320, the UE identifies, when the configured number of ROs exceeds the RO capacity of one or more configured RACH slots defined within a reference slot, one or more additional RACH slots within the reference slot. For example, UE 104 may identify, when the configured number of ROs exceeds the RO capacity of one or more configured RACH slots defined within a reference slot, one or more additional RACH slots within the reference slot (e.g., RACH slots 0-7 or 0-15 in FIG. 10C).

At 1330, the UE transmits a physical RACH (PRACH) preamble in an RO in one of the configured RACH slots or the additional RACH slots. For example, UE 104 may transmit a PRACH preamble in an RO in one of the configured RACH slots or the additional RACH slots (e.g., in accordance with Alt 1 or Alt 2 in FIG. 10C).

FIG. 14 illustrates example operations for wireless communications by a network entity in accordance with some aspects of the present disclosure. For example, a base station 102 (e.g., a gNB) may perform the example operations 1400.

At 1410, the network entity transmits, to a user equipment UE, RACH configuration configuring the UE with a number of ROs. For example, BS 102/180 may transmit to UE 104 a RACH configuration configuring UE 104 with a number of ROs.

At 1420, the network entity identifies, when the configured number of ROs exceeds the RO capacity of one or more configured RACH slots defined within a reference slot, one or more additional RACH slots within the reference slot. For example, BS 102/180 may identify, when the configured number of ROs exceeds the RO capacity of one or more configured RACH slots defined within a reference slot, one or more additional RACH slots within the reference slot (e.g., the extra RACH slots of FIG. 10C).

At 1430, the network entity monitors ROs in the configured RACH slots and the additional RACH slots for a PRACH preamble from the UE. For example, BS 102/180 may monitor ROs in the configured RACH slots and the additional RACH slots for a PRACH preamble from UE 104.

Example Wireless Communication Devices

Figure 15:
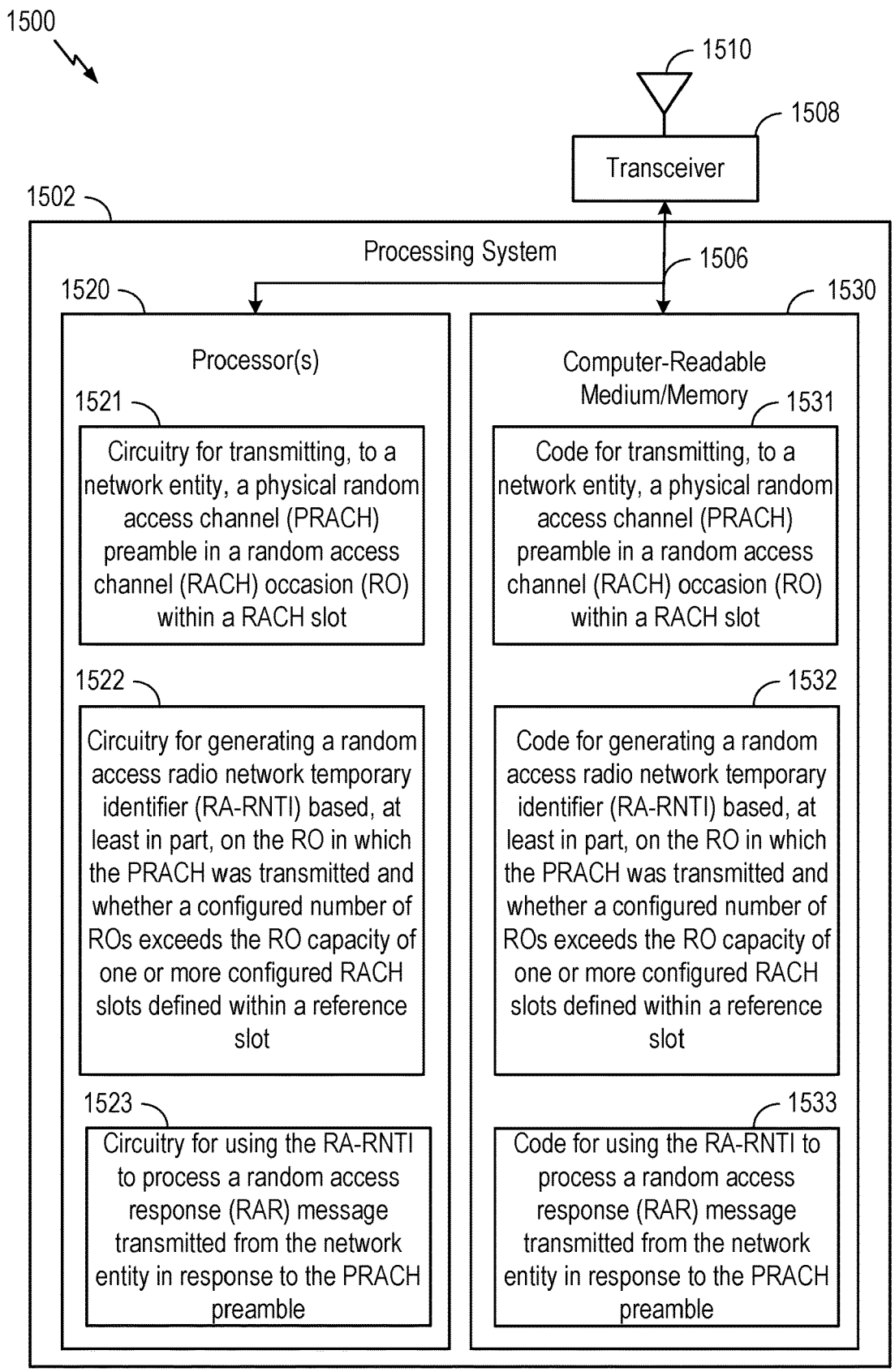
FIG. 15 depicts aspects of an example communications device.

FIG. 15 depicts an example communications device 1500 that includes various components operable, configured, or adapted to perform operations for the techniques disclosed herein, such as the operations depicted and described with respect to FIG. 11. In some examples, communication device 1500 may be a user equipment 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 11, or other operations for performing the various techniques discussed herein for transmitting SSBs with patterns for SCS.

In the depicted example, computer-readable medium/memory 1530 stores code 1531 for transmitting, to a network entity, a physical random access channel (PRACH) preamble in a random access channel (RACH) occasion (RO) within a RACH slot; code 1532 for generating a random access radio network temporary identifier (RA-RNTI) based, at least in part, on the RO in which the PRACH was transmitted and whether a configured number of ROs exceeds the RO capacity of one or more configured RACH slots defined within a reference slot; and code 1533 for using the RA-RNTI to process a random access response (RAR) message transmitted from the network entity in response to the PRACH preamble.

In the depicted example, the one or more processors 1520 include circuitry configured to implement the code stored in the computer-readable medium/memory 1530, including circuitry 1521 for transmitting, to a network entity, a PRACH preamble in a RO within a RACH slot; circuitry 1522 for generating an RA-RNTI based, at least in part, on the RO in which the PRACH was transmitted and whether a configured number of ROs exceeds the RO capacity of one or more configured RACH slots defined within a reference slot; and circuitry 1523 for using the RA-RNTI to process a RAR message transmitted from the network entity in response to the PRACH preamble.

Various components of communications device 1500 may provide means for performing the methods described herein, including with respect to FIG. 11.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the user equipment 104 illustrated in FIG. 2 and/or transceiver 1508 and antenna 1510 of the communication device 1500 in FIG. 15.

In some examples, means for transmitting, generating, or using may include various processing system components, such as: the one or more processors 1520 in FIG. 15, or aspects of the user equipment 104 depicted in FIG. 2, including receive processor 258, transmit processor 264, TX MIMO processor 266, and/or controller/processor 280 (including an RA-RNTI manager component 281).

Notably, FIG. 15 is an example, and many other examples and configurations of communication device 1500 are possible.

Figure 16:
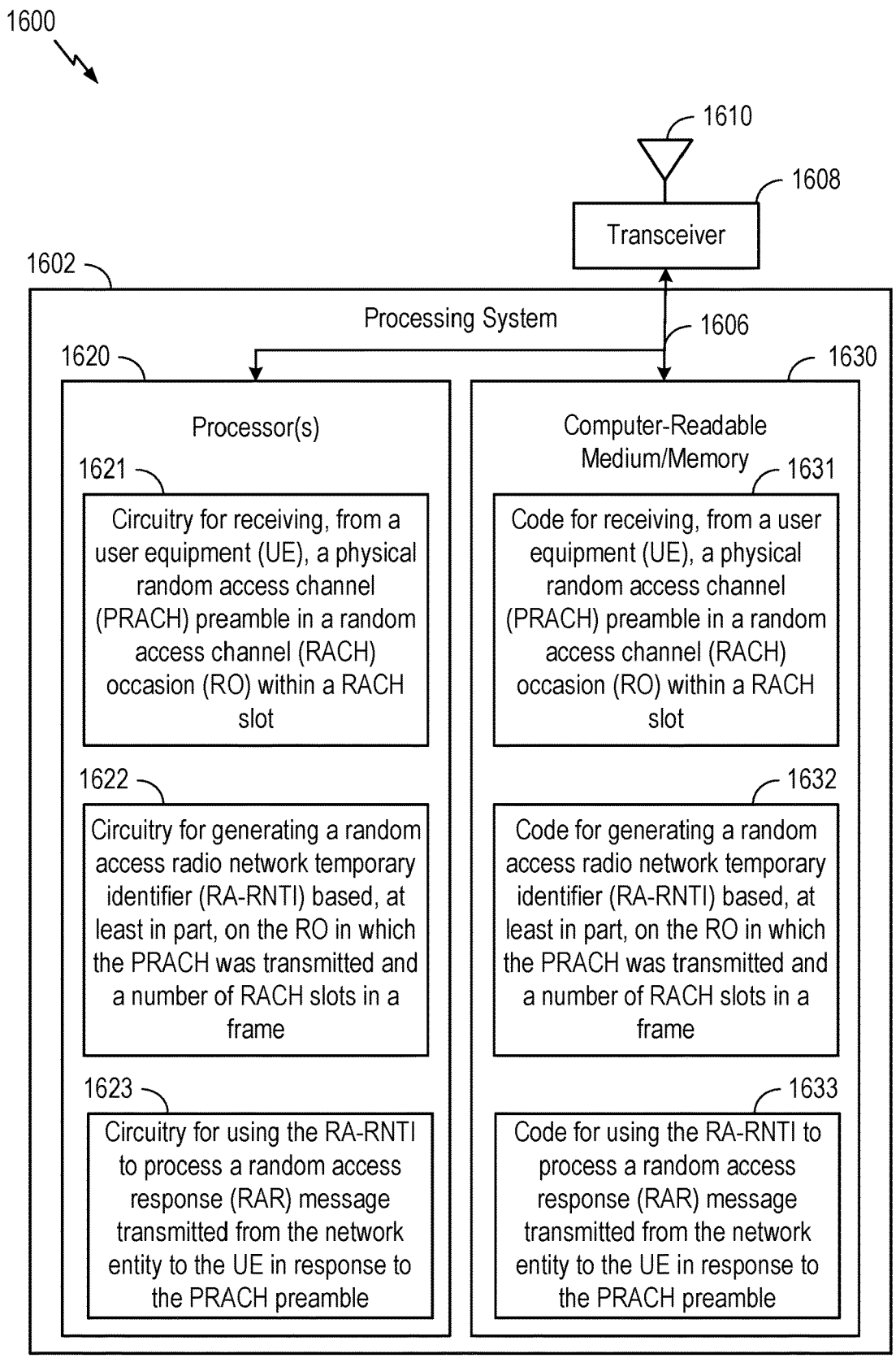
FIG. 16 depicts aspects of an example communications device.

FIG. 16 depicts an example communications device 1600 that includes various components operable, configured, or adapted to perform operations for the techniques disclosed herein, such as the operations depicted and described with respect to FIG. 12. In some examples, communication device 1600 may be a base station 102 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1630 via a bus 1606. In certain aspects, computer-readable medium/memory 1630 is configured to store instructions (e.g., computer-executable code) that when executed by the one or more processors 1620, cause the one or more processors 1620 to perform the operations illustrated in FIG. 12, or other operations for performing the various techniques discussed herein for generating random access (RA) radio network temporary identifiers (RA-RNTIs) for higher frequency sub-carrier spacing (SCS).

In the depicted example, computer-readable medium/memory 1630 stores code 1631 for receiving, from a UE, a PRACH preamble in a RO within a RACH slot; code 1632 for generating an RA-RNTI based, at least in part, on the RO in which the PRACH was transmitted and a number of RACH slots in a frame; and code 1633 for using the RA-RNTI to process a RAR message transmitted from the network entity to the UE in response to the PRACH preamble.

In the depicted example, the one or more processors 1620 include circuitry configured to implement the code stored in the computer-readable medium/memory 1630, including circuitry 1621 for receiving, from a UE, a PRACH preamble in a RO within a RACH slot; circuitry 1622 for generating an RA-RNTI based, at least in part, on the RO in which the PRACH was transmitted and a number of RACH slots in a frame; and circuitry 1623 for using the RA-RNTI to process a RAR message transmitted from the network entity to the UE in response to the PRACH preamble.

Various components of communications device 1600 may provide means for performing the methods described herein, including with respect to FIG. 12.

In some examples, means for transmitting or sending (or means for outputting for transmission) may include the transceivers 232 and/or antenna(s) 234 of the base station 102 illustrated in FIG. 2 and/or transceiver 1608 and antenna 1610 of the communication device 1600 in FIG. 16.

In some examples, means for receiving (or means for obtaining) may include the transceivers 232 and/or antenna(s) 234 of the base station 102 illustrated in FIG. 2 and/or transceiver 1608 and antenna 1610 of the communication device 1600 in FIG. 16.

In some examples, means for receiving, generating, or using may include various processing system components, such as: the one or more processors 1620 in FIG. 16, or aspects of the base station 102 depicted in FIG. 2, including receive processor 238, transmit processor 220, TX MIMO processor 230, and/or controller/processor 240 (including an RA-RNTI manager component 241).

Notably, FIG. 16 is an example, and many other examples and configurations of communication device 1600 are possible.

Figure 17:
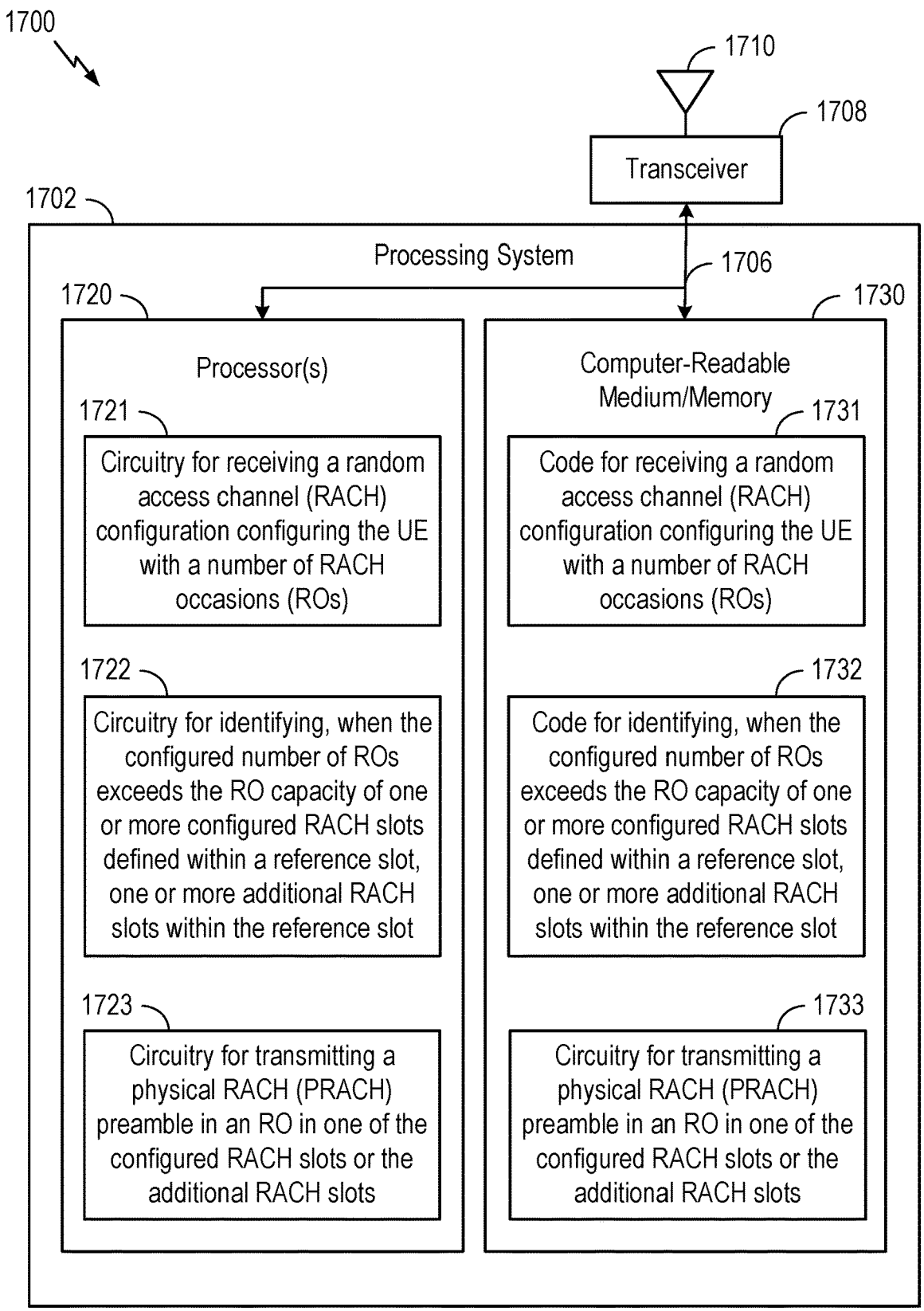
FIG. 17 depicts aspects of an example communications device.

FIG. 17 depicts an example communications device 1700 that includes various components operable, configured, or adapted to perform operations for the techniques disclosed herein, such as the operations depicted and described with respect to FIG. 13. In some examples, communication device 1700 may be a user equipment 104 as described, for example with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes one or more processors 1720 coupled to a computer-readable medium/memory 1730 via a bus 1706. In certain aspects, computer-readable medium/memory 1730 is configured to store instructions (e.g., computer-executable code) that when executed by the one or more processors 1720, cause the one or more processors 1720 to perform the operations illustrated in FIG. 13, or other operations for performing the various techniques discussed herein for transmitting SSBs with patterns for SCS In the depicted example, computer-readable medium/memory 1730 stores code 1731 for receiving a random access channel (RACH) configuration configuring the UE with a number or RACH occasions (ROs); code 1732 for identifying, when the configured number of ROs exceeds the RO capacity of one or more configured RACH slots defined within a reference slot, one or more additional RACH slots within the reference slot; and code 1733 for transmitting a physical RACH (PRACH) preamble in an RO in one of the configured RACH slots or the additional RACH slots.

In the depicted example, the one or more processors 1720 include circuitry configured to implement the code stored in the computer-readable medium/memory 1730, including circuitry 1721 for receiving a RACH configuration configuring the UE with a number of ROs; circuitry 1722 for identifying, when the configured number of ROs exceeds the RO capacity of one or more configured RACH slots defined within a reference slot, one or more additional RACH slots within the reference slot; and circuitry 1723 for transmitting a PRACH preamble in an RO in one of the configured RACH slots or the additional RACH slots.

Various components of communications device 1700 may provide means for performing the methods described herein, including with respect to FIG. 13.

In some examples, means for transmitting or sending (or means for outputting for transmission) may include the transceivers 254 and/or antenna(s) 252 of the user equipment 104 illustrated in FIG. 2 and/or transceiver 1708 and antenna 1710 of the communication device 1700 in FIG. 17.

In some examples, means for receiving (or means for obtaining) may include the transceivers 254 and/or antenna(s) 252 of the user equipment 104 illustrated in FIG. 2 and/or transceiver 1708 and antenna 1710 of the communication device 1700 in FIG. 17.

In some examples, means for receiving, identifying, or transmitting may include various processing system components, such as: the one or more processors 1720 in FIG. 17, or aspects of the user equipment 104 depicted in FIG. 2, including receive processor 258, transmit processor 264, TX MIMO processor 266, and/or controller/processor 280 (including an RA-RNTI manager component 281).

Notably, FIG. 17 is an example, and many other examples and configurations of communication device 1700 are possible.

Figure 18:
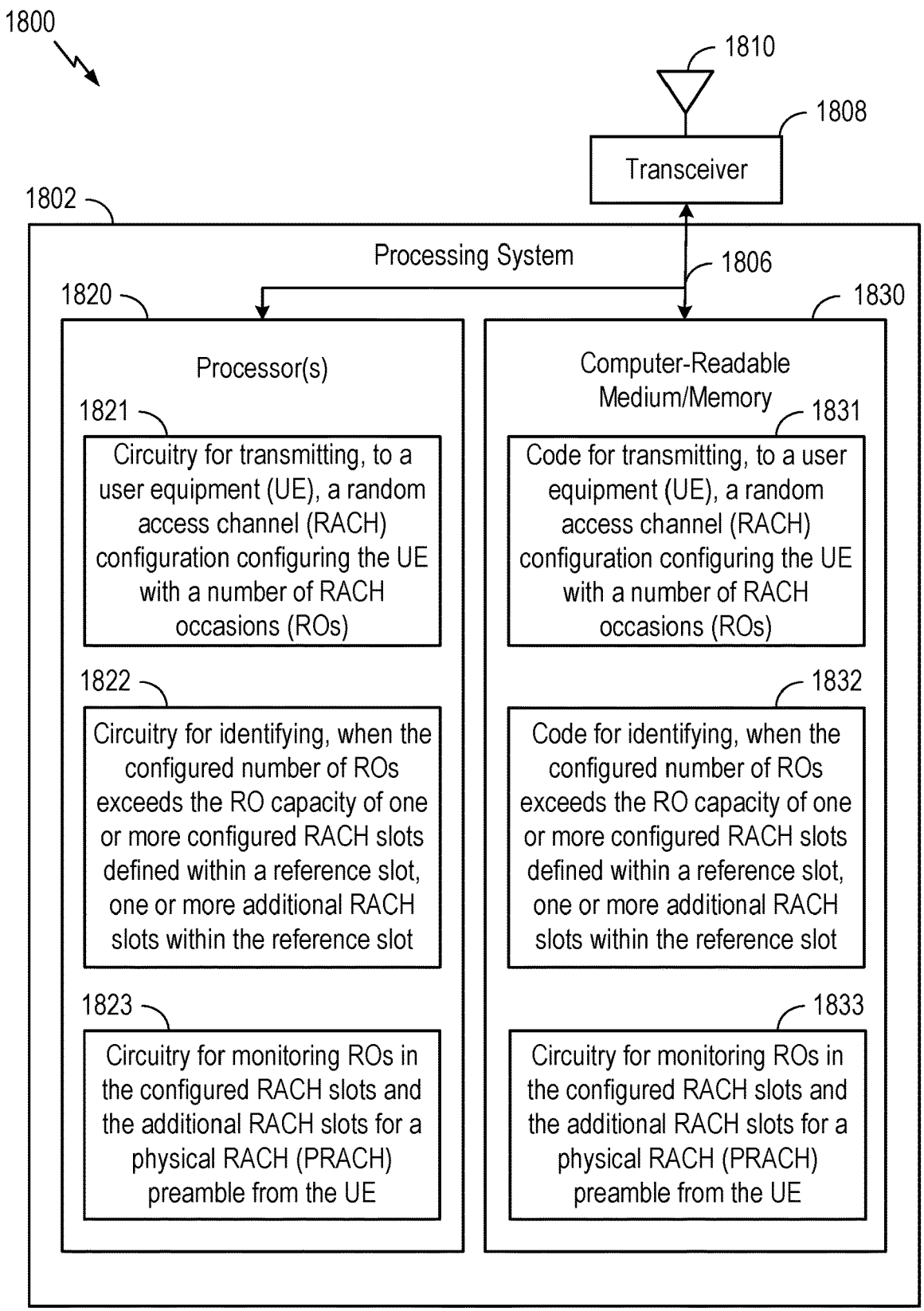
FIG. 18 depicts aspects of an example communications device.

FIG. 18 depicts an example communications device 1800 that includes various components operable, configured, or adapted to perform operations for the techniques disclosed herein, such as the operations depicted and described with respect to FIG. 14. In some examples, communication device 1800 may be a base station 102 as described, for example with respect to FIGS. 1 and 2.

Communications device 1800 includes a processing system 1802 coupled to a transceiver 1808 (e.g., a transmitter and/or a receiver). Transceiver 1808 is configured to transmit (or send) and receive signals for the communications device 1800 via an antenna 1810, such as the various signals as described herein. Processing system 1802 may be configured to perform processing functions for communications device 1800, including processing signals received and/or to be transmitted by communications device 1800.

Processing system 1802 includes one or more processors 1820 coupled to a computer-readable medium/memory 1830 via a bus 1806. In certain aspects, computer-readable medium/memory 1830 is configured to store instructions (e.g., computer-executable code) that when executed by the one or more processors 1820, cause the one or more processors 1820 to perform the operations illustrated in FIG. 14, or other operations for performing the various techniques discussed herein for receiving SSBs with patterns for SCS.

In the depicted example, computer-readable medium/memory 1830 stores code 1831 for transmitting, to a UE, a RACH configuration configuring the UE with a number of ROs; code 1832 for identifying, when the configured number of ROs exceeds the RO capacity of one or more configured RACH slots defined within a reference slot, one or more additional RACH slots within the reference slot; and code 1833 for monitoring ROs in the configured RACH slots and the additional RACH slots for a PRACH preamble from the UE.

In the depicted example, the one or more processors 1820 include circuitry configured to implement the code stored in the computer-readable medium/memory 1830, including circuitry 1821 for transmitting, to a UE, a RACH configuration configuring the UE with a number of ROs; circuitry 1822 for identifying, when the configured number of ROs exceeds the RO capacity of one or more configured RACH slots defined within a reference slot, one or more additional RACH slots within the reference slot; and circuitry 1823 for monitoring ROs in the configured RACH slots and the additional RACH slots for a PRACH preamble from the UE.

Various components of communications device 1800 may provide means for performing the methods described herein, including with respect to FIG. 14.

In some examples, means for transmitting or sending (or means for outputting for transmission) may include the transceivers 232 and/or antenna(s) 234 of the base station 102 illustrated in FIG. 2 and/or transceiver 1808 and antenna 1810 of the communication device 1800 in FIG. 18.

In some examples, means for receiving (or means for obtaining) may include the transceivers 232 and/or antenna(s) 234 of the base station illustrated in FIG. 2 and/or transceiver 1808 and antenna 1810 of the communication device 1800 in FIG. 18.

In some examples, means for transmitting, identifying, or monitoring may include various processing system components, such as: the one or more processors 1820 in FIG. 18, or aspects of the base station 102 depicted in FIG. 2, including receive processor 238, transmit processor 220, TX MIMO processor 230, and/or controller/processor 240 (including an RA-RNTI manager component 241).

Notably, FIG. 18 is an example, and many other examples and configurations of communication device 1800 are possible.

EXAMPLE CLAUSES

Implementation examples are described in the following numbered clauses:

Clause 1: A method for wireless communication by a user equipment (UE), comprising transmitting, to a network entity, a physical random access channel (PRACH) preamble in a random access channel (RACH) occasion (RO) within a RACH slot, generating a random access radio network temporary identifier (RA-RNTI) based, at least in part, on the RO in which the PRACH was transmitted and whether a configured number of ROs exceeds the RO capacity of one or more configured RACH slots defined within a reference slot, and using the RA-RNTI to process a random access response (RAR) message transmitted from the network entity in response to the PRACH preamble.

Clause 2: The method of clause 1, wherein the RACH slots have a duration based on a first subcarrier spacing (SCS), and the number of RACH slots is a same as that corresponding to a second SCS.

Clause 3: The method of clause 2, wherein the RA-RNTI is generated using an equation with a parameter corresponding to a first slot based on a numerology of the second SCS of the RO in which the PRACH preamble was transmitted.

Clause 4. The method of any one of clauses 1 through 3, wherein a configured number of ROs exceeds the RO capacity of one or more configured RACH slots defined within a reference slot, and the UE identifies one or more additional RACH slots within the reference slot.

Clause 5: The method of clause 4, wherein the RA-RNTI is generated using an equation involving a parameter corresponding to an index of a first symbol of the RO in which the PRACH preamble was transmitted within the configured or additional RACH slots.

Clause 6: The method of any one of clauses 4 and 5, wherein the RA-RNTI is generated using an equation with a parameter corresponding to a first slot based on a numerology of the second SCS of the RO in which the PRACH preamble was transmitted.

Clause 7: The method of any one of clauses 4 through 6, wherein the PRACH preamble was transmitted in an RO selected from a set of ROs that span multiple slots corresponding to a first subcarrier spacing (SCS), and the RA-RNTI is generated using an equation involving a parameter corresponding to an index of a first symbol of the RO in which the PRACH preamble was transmitted within one or more slots spanned by the set of ROs.

Clause 8: The method of clause 7, wherein a value for the parameter corresponding to the index of the first symbol can be greater than a number of symbols within a slot.

Clause 9: The method of any one of clauses 7 and 8, wherein the equation also involves a parameter corresponding to a first slot based on a numerology of a second SCS of the RO in which the PRACH preamble was transmitted.

Clause 10: The method of any one of clauses 7 through 9, further comprising selecting the RO in which the PRACH preamble is transmitted to avoid generating an RA-RNTI that has a reserved value.

Clause 11: The method of any one of clauses 7 through 10, further comprising receiving downlink control information (DCI) that schedules the RAR message, and using information obtained via the DCI when generating the RA-RNTI with the equation.

Clause 12: A method for wireless communication by a network entity, comprising receiving, from a user equipment (UE), a physical random access channel (PRACH) preamble in a random access channel (RACH) occasion (RO) within a RACH slot, generating a random access radio network temporary identifier (RA-RNTI) based, at least in part, on the RO in which the PRACH was transmitted and a number of RACH slots in a frame, and using the RA-RNTI to process a random access response (RAR) message transmitted from the network entity to the UE in response to the PRACH preamble.

Clause 13: The method of clause 12, wherein the RACH slots have a duration based on a first subcarrier spacing (SCS), and the number of RACH slots is a same as that corresponding to a second SCS.

Clause 14: The method of clause 13, wherein the RA-RNTI is generated using an equation with a parameter corresponding to a first slot based on a numerology of the second SCS of the RO in which the PRACH preamble was transmitted.

Clause 15: The method any one of clauses 12 through 14, wherein a configured number of ROs exceeds a RO capacity of one or more configured RACH slots defined within a reference slot, and the UE identifies one or more additional RACH slots within the reference slot.

Clause 16: The method of clause 15, wherein the RA-RNTI is generated using an equation involving a parameter corresponding to an index of a first symbol of the RO in which the PRACH preamble was transmitted within the configured or additional RACH slots.

Clause 17: The method of any one of clauses 15 and 16, wherein the PRACH preamble was transmitted in an RO selected from a set of ROs that span multiple sots corresponding to a first subcarrier spacing (SCS), and the RA-RNTI is generated using an equation involving a parameter corresponding to an index of a first symbol of the RO in which the PRACH preamble was transmitted within one or more slots spanned by the set of ROs.

Clause 18: The method of clause 17, wherein a value for the parameter corresponding to the index of the first symbol can be greater than a number of symbols within a slot.

Clause 19: The method of any one of clauses 17 and 18, wherein the equation also involves a parameter corresponding to a first slot based on a numerology of a second SCS of the RO in which the PRACH preamble was transmitted.

Clause 20: The method of any one of clauses 17 through 19, further comprising transmitting downlink control information (DCI) that schedules the RAR message, and using information transmitted via the DCI when generating the RA-RNTI with the equation.

Clause 21: An apparatus, comprising: a memory comprising executable instructions; one or more processors configured to execute the executable instructions and cause the apparatus to perform a method in accordance with any one of clauses 1-20.

Clause 22: An apparatus, comprising means for performing a method in accordance with any one of clauses 1-20.

Clause 23: A non-transitory computer-readable medium comprising executable instructions that, when executed by one or more processors of an apparatus, cause the apparatus to perform a method in accordance with any one of clauses 1-20.

Clause 24: A computer program product embodied on a computer-readable storage medium comprising code for performing a method in accordance with any one of clauses 1-20.

Clause 25: A method for wireless communication by a user equipment (UE), comprising receiving a random access channel (RACH) configuration configuring the UE with a number of RACH occasions (ROs), identifying, when the configured number of ROs exceeds the RO capacity of one or more configured RACH slots defined within a reference slot, one or more additional RACH slots within the reference slot, and transmitting a physical RACH (PRACH) preamble in an RO in one of the configured RACH slots or the additional RACH slots.

Clause 26: The method of clause 25, wherein a duration of the reference slot is defined by a first subcarrier spacing, and a duration of each of the configured RACH slots and additional RACH slots is defined by a second subcarrier spacing.

Clause 27: The method of any one of clauses 25 and 26, wherein the RACH configuration indicates the location of the additional RACH slots within the reference slot.

Clause 28: The method of any one of clauses 25 through 27, wherein locations of the additional RACH slots result in the configured and additional RACH slots are distributed according to a predefined pattern within the reference slot.

Clause 29: The method of any one of clauses 25 through 28, wherein the location of each additional RACH slot is adjacent a configured RACH slot.

Clause 30: The method of any one of clauses 25 through 29, wherein the additional RACH slots are used for additional ROs or beams, in addition to ROs or beams associated with the configured RACH slots.

Clause 31: The method of any one of clauses 25 through 30, wherein the additional RACH slots are used for repetitions of existing ROs or beams associated with the configured RACH slots.

Clause 32: The method of clause 31, wherein the additional RACH slots are also used for additional ROs or beams, in addition to ROs or beams associated with the configured RACH slots.

Clause 33: A method for wireless communication by a network entity, comprising transmitting, to a user equipment (UE), a random access channel (RACH) configuration configuring the UE with a number or RACH occasions (ROs), identifying, when the configured number of ROs exceeds the RO capacity of one or more configured RACH slots defined within a reference slot, one or more additional RACH slots within the reference slot, and monitoring ROs in the configured RACH slots and the additional RACH slots for a physical RACH (PRACH) preamble from the UE.

Clause 34: The method of clause 33, wherein a duration of the reference slot is defined by a first subcarrier spacing, and a duration of each of the configured RACH slots and additional RACH slots is defined by a second subcarrier spacing.

Clause 35: The method of any one of clauses 33 and 34, wherein the RACH configuration indicates the location of the additional RACH slots within the reference slot.

Clause 36: The method of any one of clauses 33 through 35, wherein locations of the additional RACH slots result in the configured and additional RACH slots are distributed according to a predefined pattern within the reference slot.

Clause 37: The method of any one of clauses 33 through 36, wherein the location of each additional RACH slot is adjacent a configured RACH slot.

Clause 38: The method of any one of clauses 33 through 37, wherein the additional RACH slots are used for additional ROs or beams, in addition to ROs or beams associated with the configured RACH slots.

Clause 39: The method of any one of clauses 33 through 38, wherein the additional RACH slots are used for repetitions of existing ROs or beams associated with the configured RACH slots.

Clause 40: The method of clause 39, wherein the additional RACH slots are also used for additional ROs or beams, in addition to ROs or beams associated with the configured RACH slots.

Clause 41: An apparatus, comprising: a memory comprising executable instructions; one or more processors configured to execute the executable instructions and cause the apparatus to perform a method in accordance with any one of clauses 25-40.

Clause 42: An apparatus, comprising means for performing a method in accordance with any one of clauses 25-40.

Clause 43: A non-transitory computer-readable medium comprising executable instructions that, when executed by one or more processors of an apparatus, cause the apparatus to perform a method in accordance with any one of clauses 25-40.

Clause 44: A computer program product embodied on a computer-readable storage medium comprising code for performing a method in accordance with any one of clauses 25-40.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of transmitting random access (RA) radio network temporary identifiers (RA-RNTIs) for higher frequency sub-carrier spacing (SCS), such as 480 kHz and 960 kHz. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) configured for wireless communication, comprising:
   memory comprising computer-executable instructions; and
   one or more processors, individual or collectively, configured to execute the computer-executable instructions and cause the UE to:
   transmit, to a network entity, a physical random access channel (PRACH) preamble in a random access channel (RACH) occasion (RO) within a RACH slot;

generate a random access radio network temporary identifier (RA-RNTI) based, at least in part, on the RO in which the PRACH was transmitted and whether a configured number of ROs exceeds RO capacity of one or more configured RACH slots defined within a reference slot; and use the RA-RNTI to process a random access response (RAR) message transmitted from the network entity in response to the PRACH preamble.

2. The UE of claim 1, wherein:
the RACH slots have a duration based on a first subcarrier spacing (SCS); and
the number of RACH slots is a same as that corresponding to a second SCS.

3. The UE of claim 2, wherein the one or more processors, individually or collectively, are configured to execute the computer-executable instructions to cause the UE to generate the RA-RNTI using an equation with a parameter corresponding to a first slot based on a numerology of the second SCS of the RO in which the PRACH preamble was transmitted.

4. The UE of claim 1, wherein:
a configured number of ROs exceeds the RO capacity of one or more configured RACH slots defined within a reference slot; and
the one or more processors, individually or collectively, are configured to execute the computer-executable instructions and further cause the UE to identify one or more additional RACH slots within the reference slot.

5. The UE of claim 4, wherein the one or more processors, individually or collectively, are configured to execute the computer-executable instructions to cause the UE to generate the RA-RNTI using an equation involving a parameter corresponding to an index of a first symbol of the RO in which the PRACH preamble was transmitted within the configured or additional RACH slots.

6. The UE of claim 4, wherein the one or more processors, individually or collectively, are configured to execute the computer-executable instructions to cause the UE to generate the RA-RNTI using an equation with a parameter corresponding to a first slot based on a numerology of a second SCS of the RO in which the PRACH preamble was transmitted.

7. The UE of claim 4, wherein:
the one or more processors, individually or collectively, are configured to execute the computer-executable instructions to cause the UE to transmit the PRACH preamble in an RO selected from a set of ROs that span multiple slots corresponding to a first subcarrier spacing (SCS); and
the one or more processors, individually or collectively, are configured to execute the computer-executable instructions to cause the UE to generate the RA-RNTI using an equation involving a parameter corresponding to an index of a first symbol of the RO in which the PRACH preamble was transmitted within one or more slots spanned by the set of ROs.

8. The UE of claim 7, wherein a value for the parameter corresponding to the index of the first symbol can be greater than a number of symbols within a slot.

9. The UE of claim 7, wherein the equation also involves a parameter corresponding to a first slot based on a numerology of a second SCS of the RO in which the PRACH preamble was transmitted.

10. The UE of claim 7, wherein the one or more processors, individually or collectively, are configured to execute the computer-executable instructions and further cause the UE to select the RO in which the PRACH preamble is transmitted to avoid generating an RA-RNTI that has a reserved value.

11. The UE of claim 7, wherein the one or more processors, individually or collectively, are configured to execute the computer-executable instructions and further cause the UE to:
receive downlink control information (DCI) that schedules the RAR message; and
use information obtained via the DCI when generating the RA-RNTI with the equation.

12. A network entity configured for wireless communication, comprising:
memory comprising computer-executable instructions; and
one or more processors, individually or collectively, configured to execute the computer-executable instructions and cause the network entity to:
receive, from a user equipment (UE), a physical random access channel (PRACH) preamble in a random access channel (RACH) occasion (RO) within a RACH slot;
generate a random access radio network temporary identifier (RA-RNTI) based, at least in part, on the RO in which the PRACH was transmitted and a number of RACH slots in a frame; and
use the RA-RNTI to process a random access response (RAR) message transmitted from the network entity to the UE in response to the PRACH preamble.

13. The network entity of claim 12, wherein:
the RACH slots have a duration based on a first subcarrier spacing (SCS); and
the number of RACH slots is a same as that corresponding to a second SCS.

14. The network entity of claim 13, wherein the one or more processors, individually or collectively, are configured to execute the computer-executable instructions to cause the network entity to generate the RA-RNTI using an equation with a parameter corresponding to a first slot based on a numerology of the second SCS of the RO in which the PRACH preamble was transmitted.

15. The network entity of claim 12, wherein:
a configured number of ROs exceeds a RO capacity of one or more configured RACH slots defined within a reference slot; and
the UE identifies one or more additional RACH slots within the reference slot.

16. The network entity of claim 15, wherein the one or more processors, individually or collectively, are configured to execute the computer-executable instructions to cause the network entity to generate the RA-RNTI using an equation involving a parameter corresponding to an index of a first symbol of the RO in which the PRACH preamble was transmitted within the configured or additional RACH slots.

17. The network entity of claim 15, wherein:
the PRACH preamble was transmitted in an RO selected from a set of ROs that span multiple sots corresponding to a first subcarrier spacing (SCS); and
the one or more processors, individually or collectively, are configured to execute the computer-executable instructions to cause the network entity to generate the RA-RNTI using an equation involving a parameter corresponding to an index of a first symbol of the RO in which the PRACH preamble was transmitted within one or more slots spanned by the set of ROs.

18. The network entity of claim 17, wherein a value for the parameter corresponding to the index of the first symbol can be greater than a number of symbols within a slot.

19. The network entity of claim 17, wherein the equation also involves a parameter corresponding to a first slot based on a numerology of a second SCS of the RO in which the PRACH preamble was transmitted.

20. The network entity of claim 17, wherein the one or more processors, individually or collectively, are configured to execute the computer-executable instructions and further cause the network entity to:
 transmit downlink control information (DCI) that schedules the RAR message; and
 use information transmitted via the DCI when generating the RA-RNTI with the equation.

21. A method for wireless communication by a user equipment (UE), comprising:
 transmitting, to a network entity, a physical random access channel (PRACH) preamble in a random access channel (RACH) occasion (RO) within a RACH slot;
 generating a random access radio network temporary identifier (RA-RNTI) based, at least in part, on the RO in which the PRACH was transmitted and whether a configured number of ROs exceeds RO capacity of one or more configured RACH slots defined within a reference slot; and
 using the RA-RNTI to process a random access response (RAR) message transmitted from the network entity in response to the PRACH preamble.

22. A method for wireless communication by a network entity, comprising:
 receiving, from a user equipment (UE), a physical random access channel (PRACH) preamble in a random access channel (RACH) occasion (RO) within a RACH slot;
 generating a random access radio network temporary identifier (RA-RNTI) based, at least in part, on the RO in which the PRACH was transmitted and a number of RACH slots in a frame; and
 using the RA-RNTI to process a random access response (RAR) message transmitted from the network entity to the UE in response to the PRACH preamble.

* * * * *